(12) United States Patent
Sugita et al.

(10) Patent No.: US 8,917,087 B2
(45) Date of Patent: Dec. 23, 2014

(54) MOVING MAGNETIC FIELD GENERATING APPARATUS

(75) Inventors: Satoshi Sugita, Nagano (JP); Yasushi Misawa, Nagano (JP); Yuqi Tang, Nagano (JP); Shigenori Miyairi, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 496 days.

(21) Appl. No.: 13/248,170

(22) Filed: Sep. 29, 2011

(65) Prior Publication Data

US 2012/0074930 A1   Mar. 29, 2012

(30) Foreign Application Priority Data

Sep. 29, 2010   (JP) ................................. 2010-220070

(51) Int. Cl.
| | | |
|---|---|---|
| *G01B 7/30* | (2006.01) | |
| *H02K 41/03* | (2006.01) | |
| *H02K 16/02* | (2006.01) | |
| *H02K 21/12* | (2006.01) | |
| *H02K 44/00* | (2006.01) | |
| *H02K 49/10* | (2006.01) | |
| *H02K 7/18* | (2006.01) | |

(52) U.S. Cl.
CPC .............. *H02K 41/031* (2013.01); *H02K 16/02* (2013.01); *H02K 21/12* (2013.01); *H02K 44/00* (2013.01); *H02K 49/102* (2013.01); *H02K 7/1838* (2013.01); *H02K 2213/03* (2013.01); *Y02E 10/725* (2013.01)
USPC ....................................................... 324/207.2

(58) Field of Classification Search
CPC ..... H02K 21/12; H02K 7/1838; H02K 44/00; H02K 41/031; H02K 49/102; H02K 2213/03; G01N 27/9033; G01N 27/9093; H01L 21/68; G01L 3/00
See application file for complete search history.

(56) References Cited

U.S. PATENT DOCUMENTS

| | | | | |
|---|---|---|---|---|
| 3,646,376 | A  * | 2/1972 | Anderson | 310/156.64 |
| 5,663,641 | A  * | 9/1997 | Morita | 324/174 |
| 7,262,536 | B2 * | 8/2007 | Rahman et al. | 310/156.35 |
| 8,446,060 | B1 * | 5/2013 | Lugg | 310/156.22 |
| 2006/0279166 | A1 | 12/2006 | Takeuchi | |
| 2008/0169720 | A1 | 7/2008 | Petek | |

(Continued)

FOREIGN PATENT DOCUMENTS

| | | |
|---|---|---|
| EP | 1480316 | 11/2004 |
| EP | 2256909 | 12/2010 |

(Continued)

OTHER PUBLICATIONS

European Search Report dated Jan. 15, 2014, 7 pages.

*Primary Examiner* — Vinh Nguyen
(74) *Attorney, Agent, or Firm* — Rankin, Hill & Clark LLP

(57) ABSTRACT

A moving magnetic field generating apparatus includes a magnet array including magnets disposed at a first pitch such that N and S poles of adjacent magnets in the magnet array are alternated, and first and second magnetic pole piece arrays extending along the magnet array to interpose the magnet array therebetween with a gap from the magnet array. The first and second magnetic pole piece arrays are disposed with a predetermined phase difference therebetween. The first magnetic pole piece array includes first magnetic pole pieces disposed at a second pitch in an array and each having a length enough to face at least two adjacent magnets in the magnet array. The second magnetic pole piece array is configured similarly to the first magnetic pole piece array. One of the first and second magnetic pole piece arrays and the magnet array is relatively moved to the other at a predetermined speed.

7 Claims, 33 Drawing Sheets

(56) References Cited

U.S. PATENT DOCUMENTS

| | | |
|---|---|---|
| 2011/0001364 A1 | 1/2011 | Oya et al. |
| 2011/0025158 A1 | 2/2011 | Aiki et al. |

FOREIGN PATENT DOCUMENTS

| | | |
|---|---|---|
| JP | 62-182620 | 8/1987 |
| JP | 3452709 B2 | 9/2003 |
| JP | 2005-245045 | 9/2005 |
| JP | 2006-191782 | 7/2006 |
| JP | 2009-095173 | 4/2009 |
| JP | 2009-247046 | 10/2009 |
| JP | 2009-261071 | 11/2009 |
| WO | 02/091548 | 11/2002 |

* cited by examiner

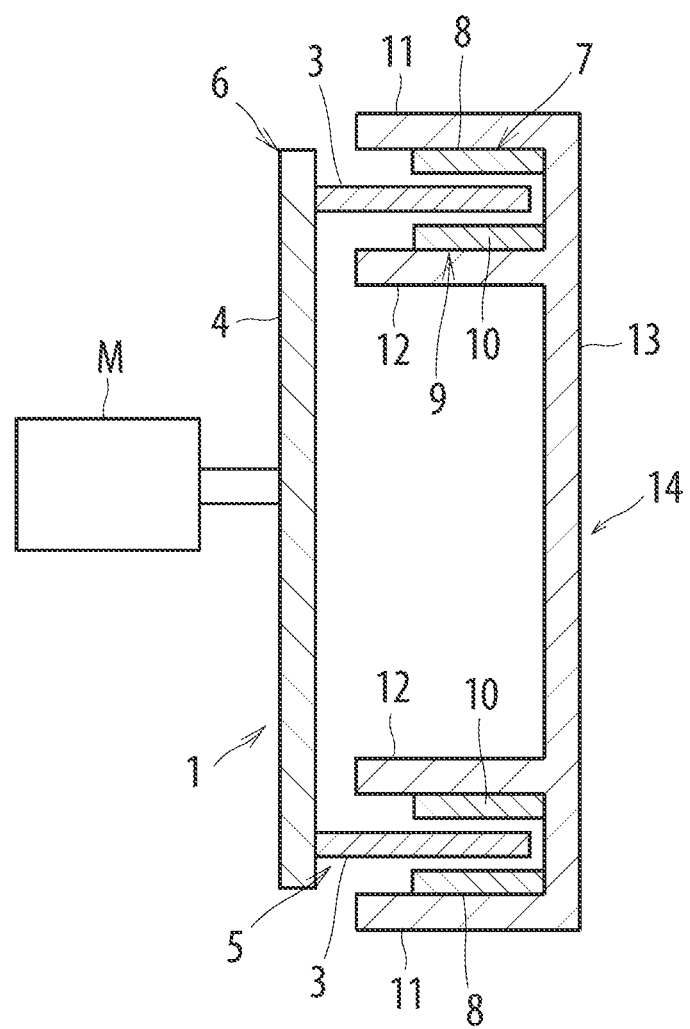

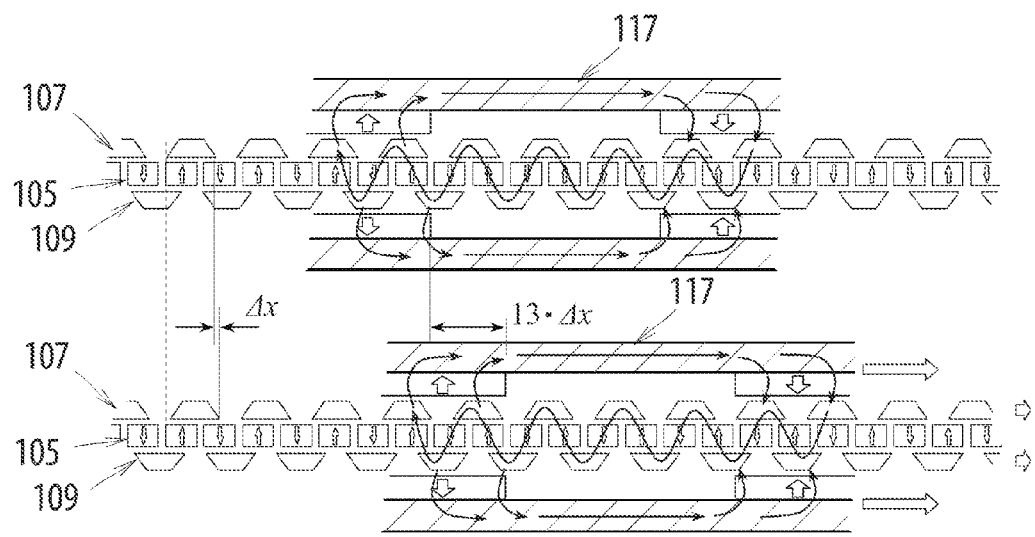

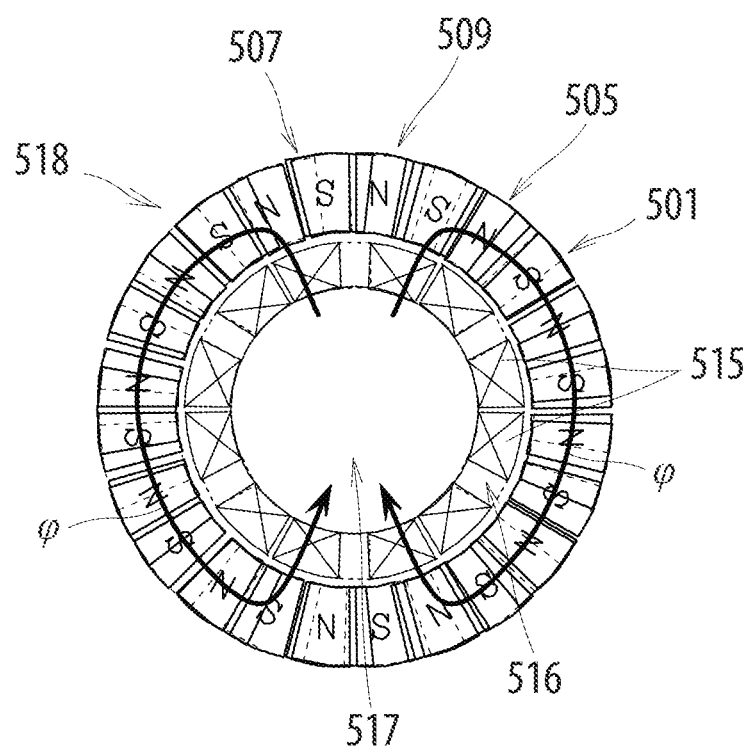

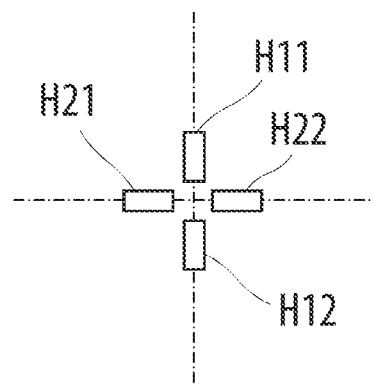

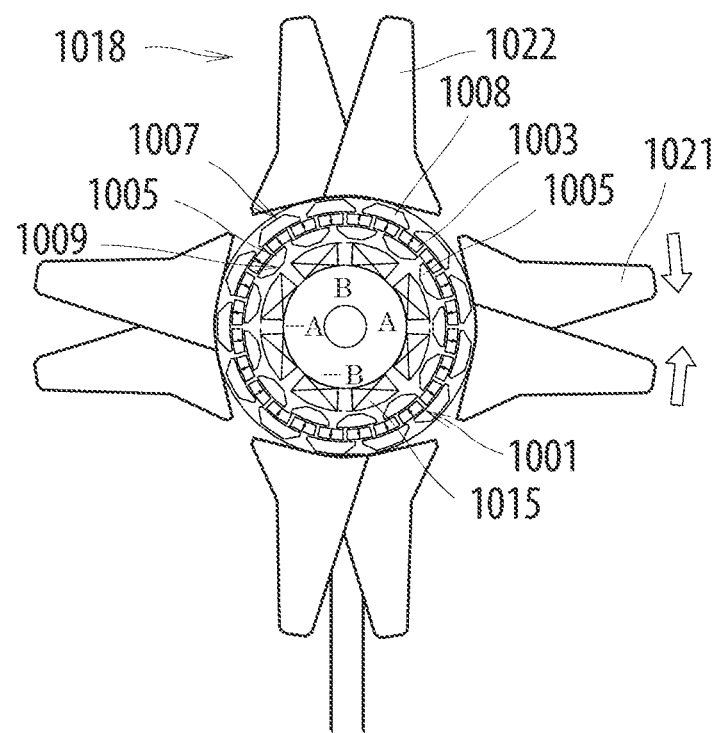

US 8,917,087 B2

MOVING MAGNETIC FIELD GENERATING APPARATUS

BACKGROUND OF THE INVENTION

1. Technical Field

The present invention relates to a moving magnetic field generating apparatus, and to an apparatus configured to utilize a high-speed moving magnetic field generated by the moving magnetic field generating apparatus.

2. Description of the Related Art

Japanese Patent No. 3452709 discloses a moving magnetic field generating apparatus configured to generate a moving magnetic field for use in continuous casting.

The conventional moving magnetic field generating apparatus is incapable of generating a magnetic field that moves at a high speed.

SUMMARY OF THE INVENTION

An object of the present invention is to provide a moving magnetic field generating apparatus capable of generating a high speed moving magnetic field that moves at a speed higher than that of the conventional moving magnetic field generating apparatus.

Another object of the present invention is to provide an apparatus configured to utilize a high-speed moving magnetic field generated by the moving magnetic field generating apparatus.

A moving magnetic field generating apparatus of the present invention includes: a magnet array including a plurality of magnets disposed at a first pitch such that N and S poles of adjacent magnets in the magnet array are alternated; and first and second magnetic pole piece arrays extending along the magnet array to interpose the magnet array therebetween with a gap from the magnet array. The first and second magnetic pole piece arrays are disposed with a predetermined phase difference between each other. The first magnetic pole piece array includes a plurality of first magnetic pole pieces disposed at a second pitch in an array and each having a length enough to face at least two adjacent magnets in the magnet array. The second magnetic pole piece array includes a plurality of second magnetic pole pieces disposed at the second pitch in an array and each having a length enough to face at least two adjacent magnets in the magnet array. The first and second pitches and the phase difference are determined such that, when one of the first and second magnetic pole piece arrays and the magnet array makes a relative movement with respect to the other at a predetermined relative moving speed, magnetic flux emanating from n consecutive magnets in the magnet array (n is a natural number of N or less) forms synthesized magnetic flux that sequentially passes through the first magnetic pole pieces in the first magnetic pole piece array facing the n magnets and the second magnetic pole pieces in the second magnetic pole piece array facing the n magnets, thereby forming a high-speed moving magnetic field that moves at a speed faster than the predetermined relative moving speed. The term "relative moving speed" means a speed at which one of the first and second magnetic pole piece arrays and the magnet array moves with respect to the other when one of them moves, the other of them moves, or both of them move.

According to the moving magnetic field generating apparatus of the present invention, a high-speed moving magnetic field can be easily formed by the synthesized magnetic flux that moves at a speed faster than the relative moving speed.

Specifically, defining: a reference movement length as L, the number of the plurality of magnets in the magnet array per the reference movement length as 2N, the number of magnetic pole pieces in each of the first and second magnetic pole piece arrays per the reference movement length as M=N+a, where a is an integer other than 0 (a=..., −3, −2, −1, 1, 2, 3, ...), the moving speed of the magnetic pole pieces as vs, and the moving speed of the magnet array as vm, the first pitch τp of the magnets satisfies τp=L/(2·N); the second pitch τs of the magnetic pole pieces satisfies τs=L/M; the pitch τt of the synthesized magnetic poles satisfies τt=L/|(2·a)|; and the moving speed vt of the synthesized magnetic poles (or the high-speed moving magnetic field) satisfies vt=(M/a)·vs−(N/a)·vm. The term "reference movement length" refers, for a rotary moving magnetic field generating apparatus, to the length of movement of a rotary member as the rotary member is rotated by 360 degrees in terms of mechanical angle. For a linear moving magnetic field generating apparatus, the term refers to the length of movement of a linearly movable member corresponding to the length of movement of the rotary member of the rotary moving magnetic field generating apparatus as the rotary member is rotated by 360 degrees in terms of mechanical angle.

The pitch τt of the synthesized magnetic poles corresponds to the length of each synthesized magnetic pole. If the magnetic pole piece arrays are moved at a speed vs, the moving speed vt of the synthesized magnetic poles (or the high-speed moving magnetic field) is (M/a) times vs. If the magnet array is moved at a speed −vm, the moving speed vt of the synthesized magnetic poles (or the high-speed moving magnetic field) is (N/a) times vm. A magnetic field that moves at a high speed can be obtained when either of the magnetic pole piece arrays and the magnet array is moved. A magnetic field that moves at a further higher speed can be obtained when both of the magnetic pole piece arrays and the magnet array are moved in directions opposite to each other.

The magnet array and the first and second magnetic pole piece arrays may each have a linear shape. Alternatively, the magnet array and the first and second magnetic pole piece arrays may each have a concentric annular shape.

In another aspect of the present invention, a linear or rotary magnetism transfer speed increasing/decreasing apparatus is provided to include: the moving magnetic field generating apparatus according to the present invention; and a moving device including a movable magnet array including a plurality of magnets disposed at a predetermined pitch such that N and S poles of adjacent magnets in the magnet array are alternated. The magnets in the movable magnet array are disposed to face at least one of the first and second magnetic pole piece arrays of the moving magnetic field generating apparatus.

In a further aspect of the present invention, an electric apparatus, such as a linear electric motor, a rotary electric motor, a rotary electric generator, or a linear electric generator, is provided to include: the moving magnetic field generating apparatus according to the present invention; and a magnetic pole array including a plurality of coils disposed at a predetermined pitch to form a plurality of magnetic poles. The coils in the magnetic pole array are disposed to face at least one of the first and second magnetic pole piece arrays of the moving magnetic field generating apparatus. In the conventional rotary electric motor, if the wire diameter of the winding is increased to reduce a copper loss, a large slot area is required and the magnetic resistance is increased, which may saturate the maximum thrust. In the rotary electric motor which utilizes the moving magnetic field generating apparatus according to the present invention, in contrast, a coil space factor or the space occupied by the winding can be increased without significantly varying the magnetic resistance even if the number of turns or the wire diameter of the winding is increased. Thus, the rated thrust density and the maximum thrust per size can be increased, thereby providing a high-efficiency rotary electric motor that can contribute to energy conservation. In the conventional electric generator, a speed increasing gear is used to rotate the generator at a high speed in order to allow an operation in a range where a high efficiency is achieved, that is, in a high-speed range. However, the gear has a limited life and may be broken, presenting issues to be addressed in terms of cost and maintenance. In addition, the gear may have a complicated configuration, hindering a reduction in the size of the generator. In the electric generator which uses the moving magnetic field generating apparatus according to the present invention, in contrast, the rotational speed of the synthesized magnetic field is high compared to the rotational speed of the rotor. Therefore, a high voltage is induced to enable high-efficiency power generation even when the rotational speed of the rotor is low. Thus, a speed increasing gear can be dispensed with, contributing to facilitating maintenance and achieving a size reduction and a high efficiency. A linear electric generator extending linearly may also be formed by utilizing the moving magnetic field generating apparatus according to the present invention.

In still another aspect of the present invention, a magnetic encoder is provided to include: the rotary moving magnetic field generating apparatus; and one or more Hall elements disposed to face at least one of the first and second magnetic pole piece arrays of the moving magnetic field generating apparatus. The Hall elements are configured to produce an output allowing detection of a rotational angle.

In yet another aspect of the present invention, a counter-rotating electric motor is provided to include: a first rotary structure including the magnet array of the rotary moving magnetic field generating apparatus; a second rotary structure including the first and second magnetic pole piece arrays of the moving magnetic field generating apparatus, and a motor stator including a plurality of excitation windings disposed inside the first and second rotary structures to generate a rotating magnetic field. The first rotary structure and the second rotary structure are configured to be rotatable independently of each other and rotate in directions opposite to each other.

In another aspect of the present invention, a counter-rotating electric fan is provided to include: a first impeller attached to the first rotary structure of the counter-rotating motor; and a second impeller attached to the second rotary structure of the counter-rotating motor. The first impeller and the second impeller rotate in directions opposite to each other.

In a further aspect of the present invention, a counter-rotating aerogenerator is provided to include: a first rotary structure including the magnet array of the rotary moving magnetic field generating apparatus; a second rotary structure including the first and second magnetic pole piece arrays of the moving magnetic field generating apparatus; a plurality of generation windings disposed inside the first and second rotary structures; a first impeller attached to the first rotary structure; and a second impeller attached to the second rotary structure and configured to be rotatable in a direction opposite to a rotational direction of the first impeller. The first rotary structure and the second rotary structure are configured to be rotatable independently of each other.

In still another aspect of the present invention, a flywheel power storage apparatus is provided to include: an electric generator motor; a first structure including the magnet array of the rotary moving magnetic field generating apparatus; a second structure including the first and second magnetic pole piece arrays of the moving magnetic field generating apparatus; a rotor disposed centrally of the first structure and the second structure; and a flywheel fixed to the rotor. One of the first and second structures is fixed to a rotary shaft of the generator motor. The rotor includes a magnet array including a plurality of magnets disposed at a predetermined pitch such that N and S poles of adjacent magnets in the magnet array are alternated. The flywheel may be rotated to store energy, and the energy stored in the flywheel may be output from the generator motor as electric power.

In yet another aspect of the present invention, a gravity shielding device is provided. The gravity shielding device is configured to generate a high-speed moving magnetic field and produce a gravity shielding effect by utilizing the generated moving magnetic field. The gravity shielding device includes: a first rotary structure including the magnet array of the rotary moving magnetic field generating apparatus; a second rotary structure including the first and second magnetic pole piece arrays of the moving magnetic field generating apparatus; a first motor configured to rotate the first rotary structure; and a second motor configured to rotate the second rotary structure in a direction opposite to a rotational direction of the first rotary structure. The first rotary structure and the second rotary structure are configured to be rotatable independently of each other.

BRIEF DESCRIPTION OF THE DRAWINGS

FIG. 2 schematically shows a supporting structure.

FIGS. 4A to 4C illustrate an operation of the embodiment in FIG. 3.

FIGS. 10A and 10B are each a cross-sectional view showing the structure of a rotary motor.

FIG. 14 shows an example of an arrangement pattern of four Hall elements.

FIGS. 17A and 17B are a front view and a side view, respectively, of a counter-rotating aerogenerator partially shown in cross section.

DESCRIPTION OF THE PREFERRED EMBODIMENTS

Figure 1A:
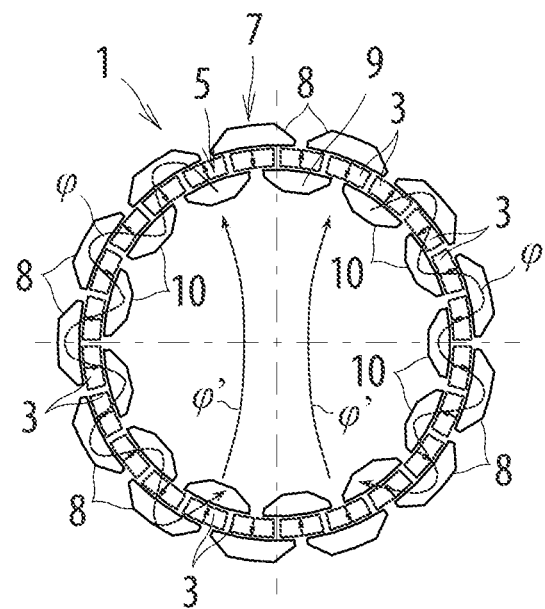
FIGS. 1A to 1C show the configuration of a rotary moving magnetic field generating apparatus according to the present invention and the flow of generated synthesized magnetic flux, and FIGS. 1D to 1F schematically show synthesized magnetic poles formed by the synthesized magnetic flux in FIGS. 1A to 1C.
Figure 1B:
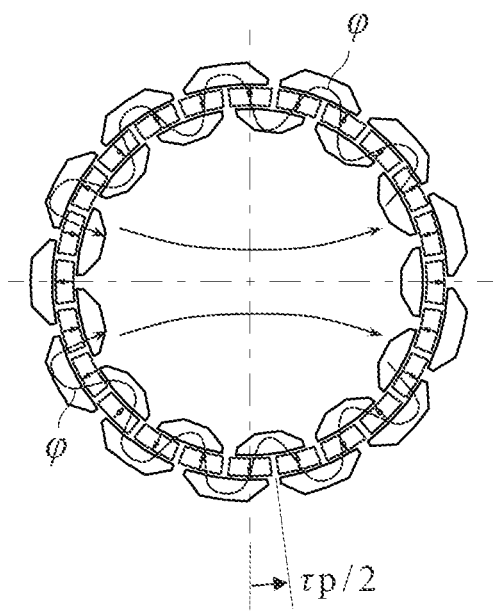
Figure 1C:
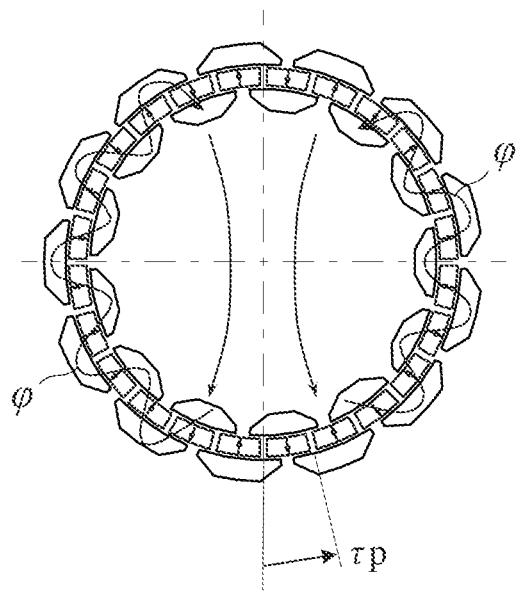
Figure 1D:
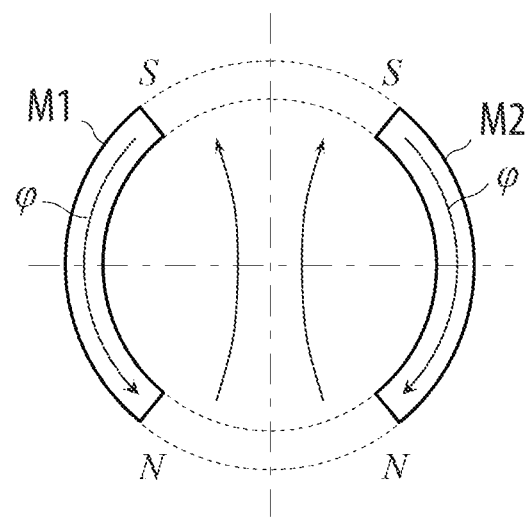
Figure 1E:
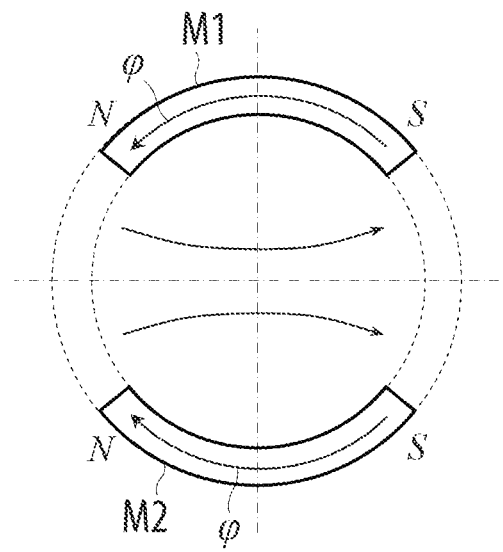
Figure 1F:
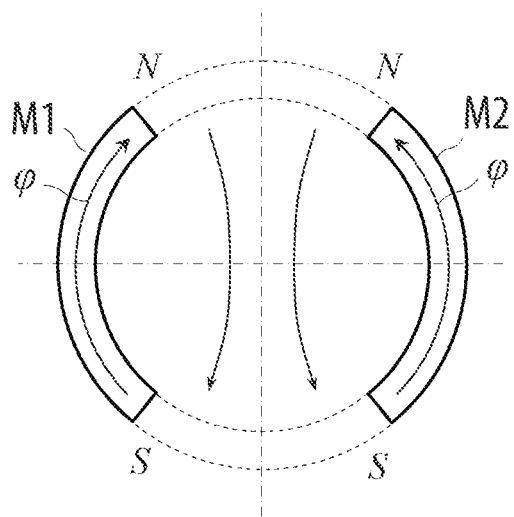

An embodiment of a moving magnetic field generating apparatus according to the present invention and embodiments of various apparatuses configured to utilize the moving magnetic field generating apparatus will be described with reference to the drawings. FIGS. 1A to 1C show the configuration of a rotary moving magnetic field generating apparatus according to the present invention and the flow of synthesized magnetic flux generated by the rotary moving magnetic field generating apparatus, and FIGS. 1D to 1F schematically show synthesized magnetic poles formed by the synthesized magnetic flux in FIGS. 1A to 1C. A rotary moving magnetic field generating apparatus 1 according to the embodiment includes an annular magnet array 5 including 2N (specifically, 24) magnets 3 disposed at a first pitch $\tau p$ such that N and S poles of adjacent magnets 3 in the magnet array 5 are alternated, and first and second annular magnetic pole piece arrays 7 and 9 extending along the magnet array 5 to interpose the magnet array 5 therebetween with a gap from the magnet array 5. The first and second magnetic pole piece arrays 7 and 9 are disposed with a predetermined phase difference (180° in terms of electrical angle; $\tau s/2$ in terms of mechanical angle) between each other. The magnets 3 in the magnet array 5 are magnetized such that magnetic poles having different polarities alternately appear in directions indicated by arrows in FIGS. 1A to 1C (radial directions). Such a magnet array 5 may be easily obtained by partially magnetizing an annular magnetic substance using a magnetizer.

As shown in FIG. 2, the magnet array 5 is supported by a rigid disk-like first support 4 to form a rotary structure (first structure) 6. The first support 4 is fixed to a shaft of a motor M. The first annular magnetic pole piece array 7 includes a plurality of first magnetic pole pieces 8 disposed at a second pitch $\tau s$ in an array and each having a length enough to face at least two adjacent magnets 3 in the magnet array 5. The second magnetic pole piece array 9 includes a plurality of second magnetic pole pieces 10 disposed at the second pitch $\tau s$ in an array and each having a length enough to face at least two adjacent magnets 3 in the magnet array 5. The first and second magnetic pole pieces 8 and 10 are each formed by an iron piece. The first and second magnetic pole piece arrays 7 and 9 are supported by a second support 13 including a pair of annular wall portions 11 and 12 facing each other in the radial direction. The first and second magnetic pole piece arrays 7 and 9 and the second support 13 form a second structure 14.

In the embodiment, when one of the first and second magnetic pole piece arrays 7 and 9 and the magnet array 5 makes a relative movement with respect to the other at a predetermined relative moving speed, magnetic flux emanating from n consecutive magnets 3 in the magnet array 5 (n is a natural number of N or less) forms synthesized magnetic flux $\phi$ that sequentially passes through the first magnetic pole pieces 8 in the first magnetic pole piece array 7 facing the n magnets 3 and the second magnetic pole pieces 10 in the second magnetic pole piece array 9 facing the n magnets 3. As shown in FIGS. 1A to 1C, the synthesized magnetic flux $\phi$ flows in a meandering manner in the order of the magnet 3, the first magnetic pole piece 8, the magnet 3, the second magnetic pole piece 10, the magnet 3, and the first magnetic pole piece 8, and leaks as leakage magnetic flux $\phi'$ to form a looped magnetic path. In the embodiment in FIG. 1, two looped magnetic paths are formed. As shown in FIGS. 1D to 1F, two rotating synthesized magnetic poles M1 and M2 are formed by the magnetic flux flowing through the two looped magnetic paths. The term "synthesized magnetic pole" refers to a magnetic pole formed by magnetic flux flowing through a looped magnetic path. In FIG. 1B, the magnet array 5 has been rotated counterclockwise by $\tau p/2$ from the state in FIG. 1A. In FIG. 1C, the magnet array 5 has been rotated counterclockwise by $\tau p$ from the state in FIG. 1A. As understood from FIGS. 1D to 1F corresponding to FIGS. 1A to 1C, respectively, rotation of the magnet array 5 by only $\tau p/2$ results in rotation of the synthesized magnetic poles M1 and M2 by a mechanical angle of 90°, and rotation of the magnet array 5 by only $\tau p$ results in rotation of the synthesized magnetic poles M1 and M2 by a mechanical angle of 180°. That is, it is possible to form a high-speed moving magnetic field that moves at a speed faster than the rotational speed of the magnet array 5 (predetermined relative moving speed). The moving speed vt of the high-speed moving magnetic field is determined by the relative moving speed vs, the first and second pitches $\tau p$ and $\tau S$, and the phase difference between the first and second magnetic pole piece arrays 7 and 9. In the embodiment, the rotational speed of the magnet array 5 corresponds to the relative moving speed. However, if the first and second magnetic pole piece arrays 7 and 9 are rotated, the rotational speed of the first and second magnetic pole piece arrays 7 and 9 corresponds to the relative moving speed. If the magnet array 5 and the first and second magnetic pole piece arrays 7 and 9 are rotated in directions opposite to each other, the total of the rotational speed of the magnet array 5 and the rotational speed of the first and second magnetic pole piece arrays 7 and 9 corresponds to the relative moving speed.

Defining a reference movement length of one unit (a length corresponding to one rotation of the magnet array 5) as L, the number of the plurality of magnets 3 in the magnet array 5 per the reference movement length L as 2N, the number of magnetic pole pieces in each of the first and second magnetic pole piece arrays 7 and 9 per the reference movement length L as $M=N+a$, where a is an integer other than 0 (a=..., −3, −2, −1, 1, 2, 3, ...), the moving speed of the magnetic pole pieces as vs, and the moving speed of the magnet array 5 as vm, the first pitch $\tau p$ of the magnets 3 satisfies $\tau p=L/(2 \cdot N)$; the second pitch $\tau s$ of the magnetic pole pieces satisfies $\tau s=L/M$; the pitch $\tau t$ of the synthesized magnetic poles, which corresponds to the length of each synthesized magnetic pole, satisfies $\tau t=L/|(2 \cdot a)|$; and the moving speed vt of the synthesized magnetic poles (or the high-speed moving magnetic field) satisfies $vt=(M/a) \cdot vs-(N/a) \cdot vm$.

If the magnetic pole piece arrays 7 and 9 are moved at a speed vs, the moving speed vt of the synthesized magnetic poles is (M/a) times vs. If the magnet array 5 is moved at a speed −vm, the moving speed vt of the synthesized magnetic poles (or the high-speed moving magnetic field) is (N/a) times vm. A magnetic field that moves at a high speed can be obtained when either of the magnetic pole piece arrays 7 and 9 and the magnet array 5 is moved. A magnetic field that moves at a further higher speed can be obtained when both of the magnetic pole piece arrays 7 and 9 and the magnet array 5 are moved in directions opposite to each other.

The magnet array 5 and the first and second magnetic pole piece arrays 7 and 9 may each have a linear shape.

Figure 3:
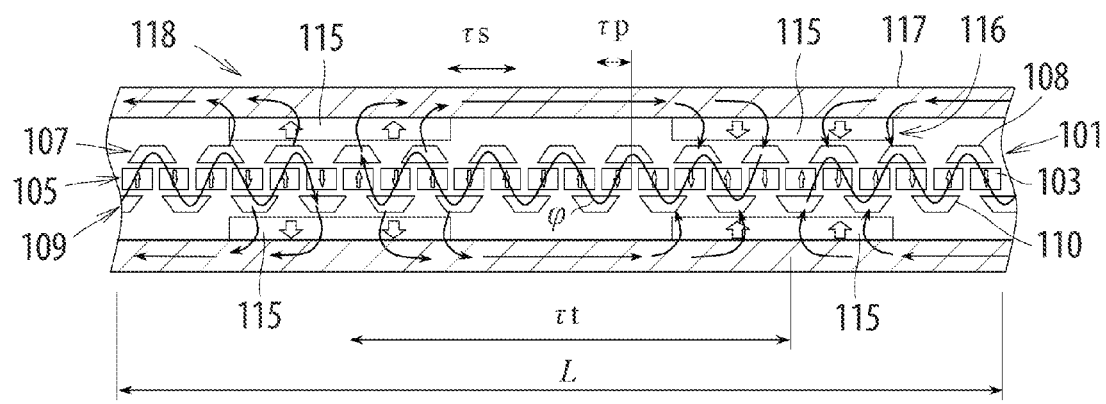
FIG. 3 shows a schematic structure of a linear magnetism transfer speed increasing/decreasing apparatus.

FIG. 3 shows a schematic structure of a linear magnetism transfer speed increasing/decreasing apparatus 118 including a moving magnetic field generating apparatus 101, and a tubular moving device 117 including a movable magnet array 116 including a plurality of magnets 115 disposed at a predetermined pitch such that N and S poles of adjacent magnets in the magnet array 116 are alternated. The magnets 115 in the movable magnet array 116 are disposed to face first and second magnetic pole piece arrays 107 and 109 of the moving magnetic field generating apparatus 101. In the linear magnetism transfer speed increasing/decreasing apparatus 118, a first support (not shown) configured to support a magnet array 105 of the moving magnetic field generating apparatus 101 is fixed to serve as a first structure, and a second support (not shown) configured to support the first and second magnetic pole piece arrays 107 and 109 serves as a second structure configured to move at a predetermined relative speed. Other basic elements are defined as follows:

the reference movement length: L;
the number of magnets 103 in the magnet array 105 per the reference movement length L: 2·N, where N is a natural number;
the pitch τp of the magnets 103 in the magnet array 105: τp=L/(2·N);
the number of magnetic pole pieces in each of the magnetic pole piece arrays 107 and 109 per the reference movement length L: M=N+a, where a is an integer other than 0 (a= . . . , −3, −2, −1, 1, 2, 3, . . . );
the pitch τs of the magnetic pole pieces: τs=L/M;
the pitch τt of the synthesized magnetic poles:τt=L/|(2·a)|;
the moving speed of the magnetic pole pieces: vs;
the moving speed of the magnet array: vm; and
the moving speed vt of the synthesized magnetic poles (or the high-speed moving magnetic field): vt=(M/a)·vs−(N/a)·vm.

In the embodiment, each of the elements is determined as follows:
L=360
2N=24
τp=15
M=13, a=1
τs=27.69
τt=180
M/a=13
N/a=12

A negative value of each of vt, vs, and vm indicates a reversed moving direction. Each of L and τt indicates a relative length, and is not limited to representation in terms of electrical angle.

Figure 4A:
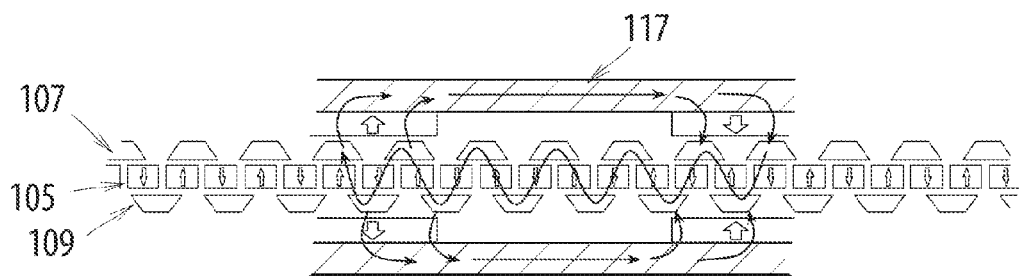
Figure 4C:
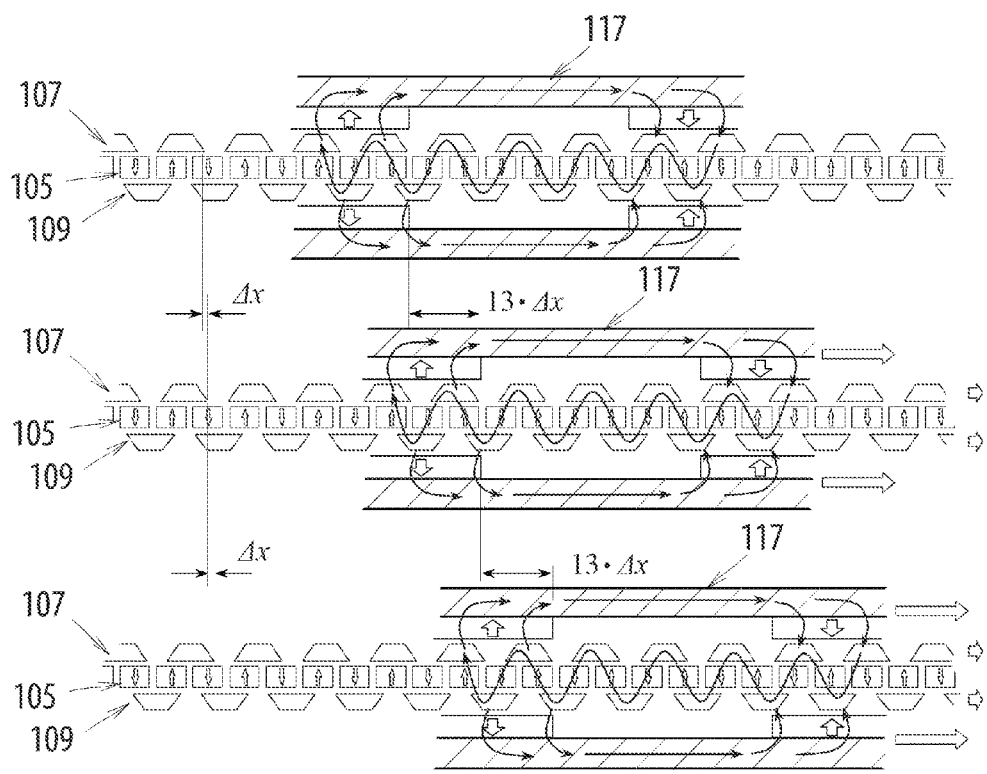

As shown in FIGS. 4A to 4C, when the first and second magnetic pole piece arrays 107 and 109 are moved by Δx, the moving device 117 is moved by 13Δx. That is, a synthesized magnetic field is moved at a speed increased by a speed increase rate of M/a to form a moving magnetic field. As a result, the moving device 117 is moved at a speed M/a times the relative speed.

Figure 5:
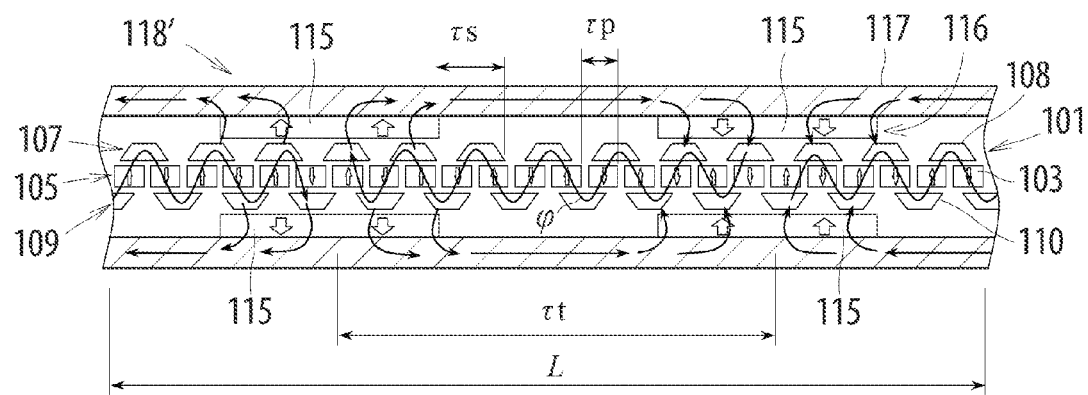
FIG. 5 shows a schematic structure of a linear magnetism transfer speed increasing/decreasing apparatus.

FIG. 5 is similar to FIG. 3, and shows a schematic structure of a linear magnetism transfer speed increasing/decreasing apparatus 118' including a moving magnetic field generating apparatus 101, and a tubular moving device 117 including a movable magnet array 116 including a plurality of magnets 115 disposed at a predetermined pitch such that N and S poles of adjacent magnets in the magnet array 116 are alternated. The magnets 115 in the movable magnet array 116 are disposed to face first and second magnetic pole piece arrays 107 and 109 of the moving magnetic field generating apparatus 101. In the linear magnetism transfer speed increasing/decreasing apparatus 118', a first support (not shown) configured to support a magnet array 105 of the moving magnetic field generating apparatus 101 serves as a first structure configured to make a relative movement, and a second support (not shown) configured to support the first and second magnetic pole piece arrays 107 and 109 is fixed to serve as a second structure. Other basic elements are defined as follows:

the reference movement length: L;
the number of magnets 103 in the magnet array 105 per the reference movement length L: 2·N, where N is a natural number;
the pitch τp of the magnets 103 in the magnet array 105: τp=L/(2·N);
the number of magnetic pole pieces in each of the magnetic pole piece arrays 107 and 109 per the reference movement length L: M=N+a, where a is an integer other than 0 (a= . . . , −3, −2, −1, 1, 2, 3, . . . );
the pitch τs of the magnetic pole pieces: τs=L/M;
the pitch τt of the synthesized magnetic poles: τt=L/|(2·a)|;
the moving speed of the magnetic pole pieces: vs;
the moving speed of the magnet array: vm; and
the moving speed vt of the synthesized magnetic poles (or the high-speed moving magnetic field): vt=(M/a)·vs−(N/a)·vm.

In the embodiment, each of the elements is determined as follows:
L=360
2N=24
τp=15
M=13, a=1
τm=27.69
τt=180
M/a=13
N/a=12

A negative value of each of vt, vs, and vm indicates a reversed moving direction.

Figure 6A:
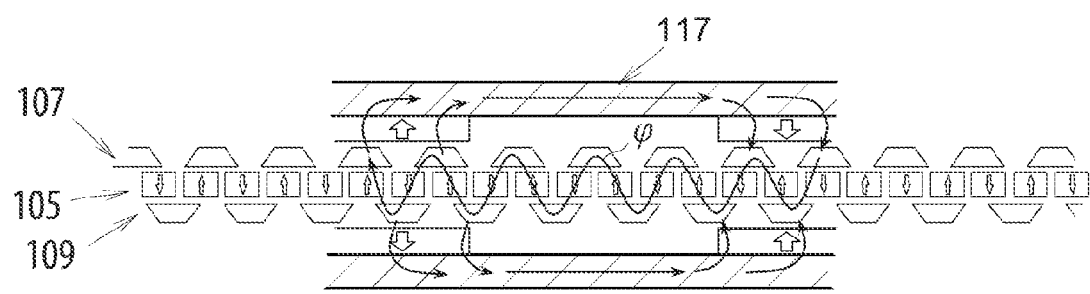
FIGS. 6A to 6C illustrate an operation of the embodiment in FIG. 5.
Figure 6B:
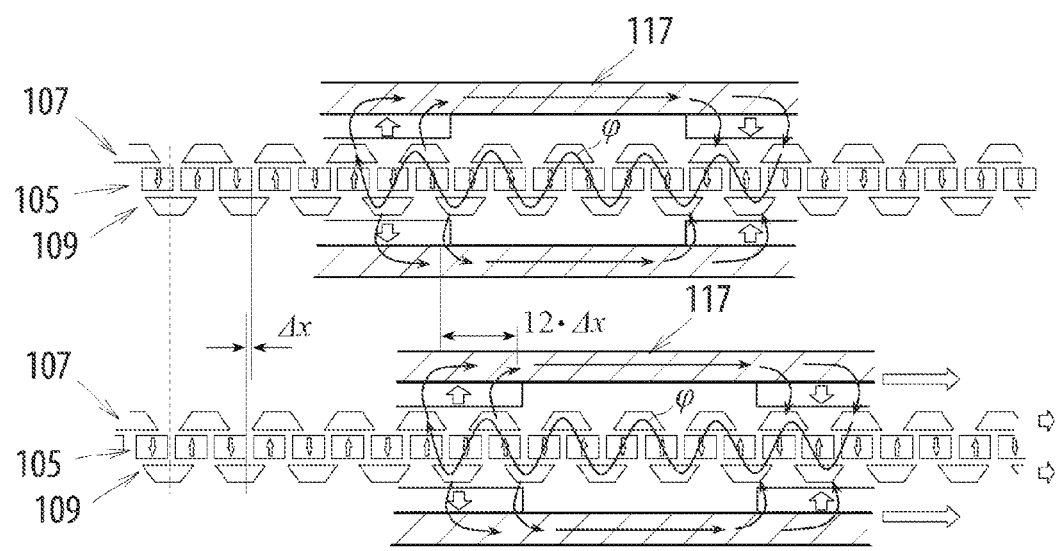
Figure 6C:
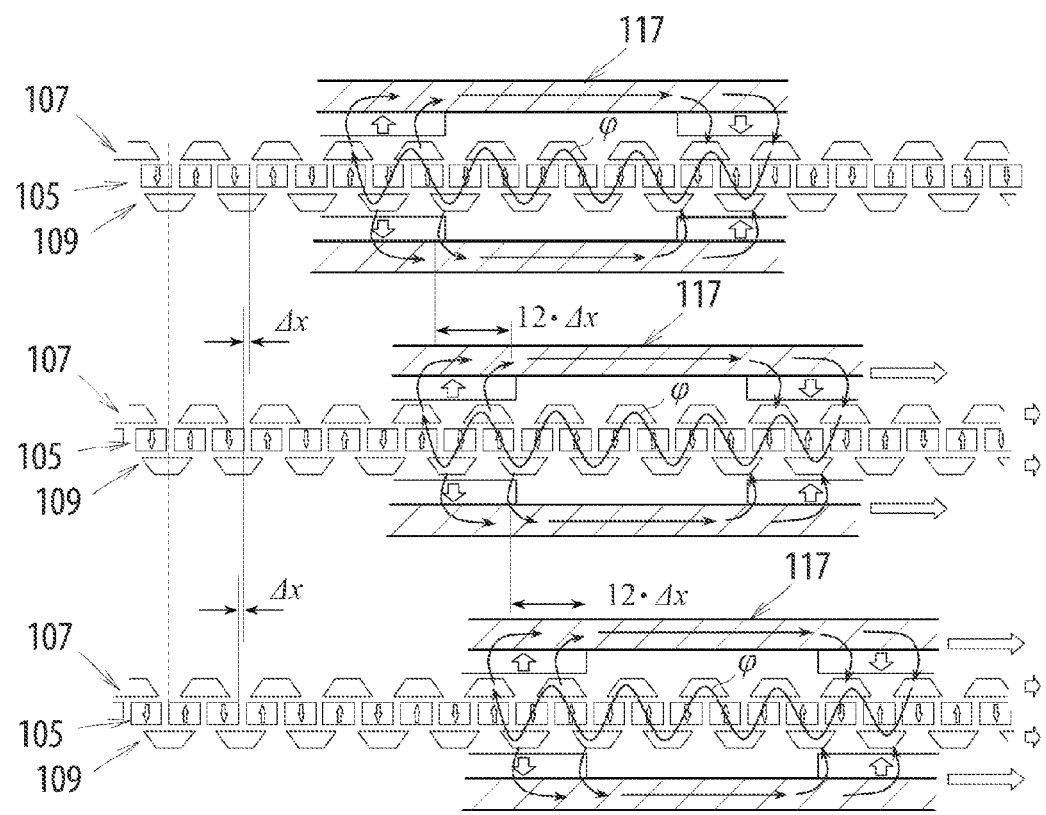

As shown in FIGS. 6A to 6C, when the magnet array 105 is moved by Δx, the moving device 117 is moved by 12Δx. That is, a synthesized magnetic field is moved at a speed increased by a speed increase rate of N/a to form a moving magnetic field. As a result, the moving device 117 is moved at a speed N/a times the relative speed.

Figure 7A:
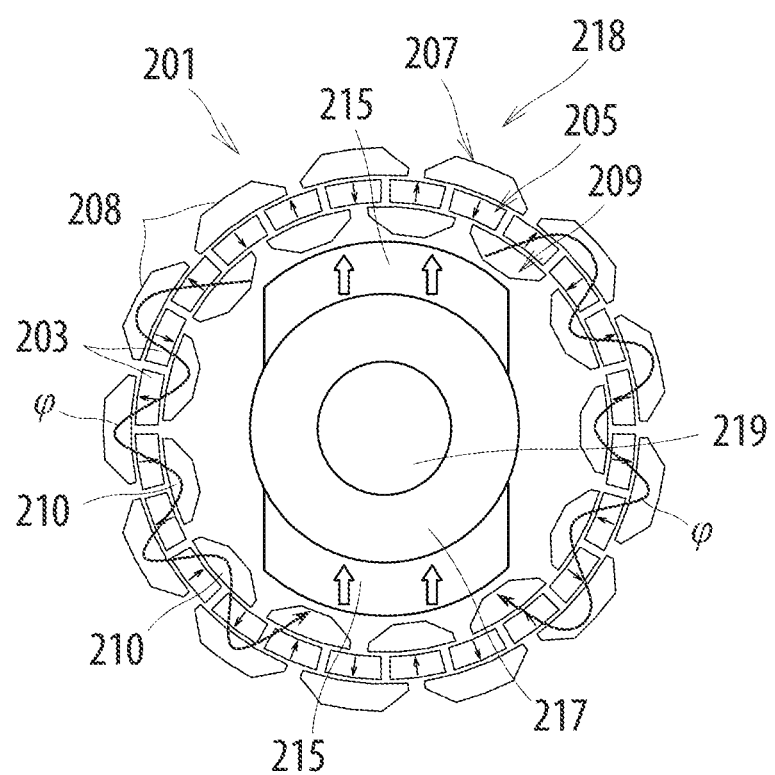
FIGS. 7A and 7B show a schematic structure of a rotary magnetism transfer speed increasing/decreasing apparatus.

FIG. 7A shows a schematic structure of a rotary magnetism transfer speed increasing/decreasing apparatus 218 including a moving magnetic field generating apparatus 201, and a cylindrical moving device 217 including a movable magnet array including two magnets 215 disposed at a pitch of 180 degrees such that N and S poles of adjacent magnets 215 in the magnet array are alternated. The magnets 215 in the movable magnet array are disposed to face a second magnetic pole piece array 209 of the moving magnetic field generating apparatus 201. The cylindrical moving device 217 is formed from a material that conducts magnetic flux, and fixed to a shaft 219 rotatably supported by a bearing device (not shown). In the rotary magnetism transfer speed increasing/decreasing apparatus 218, a first support (not shown) configured to support a magnet array 205 of the moving magnetic field generating apparatus 201 serves as a first structure, and a second support (not shown) configured to support first and second magnetic pole piece arrays 207 and 209 serves as a second structure. At least one of the first support and the second support is rotated at a relative moving speed to serve as a low-speed rotor. In contrast to the low-speed rotor, the moving device 217 serves as a high-speed rotor. The operation of the magnetism transfer speed increasing/decreasing apparatus 218 according to the embodiment is the same as the operation of the linear magnetism transfer speed increasing/decreasing apparatus shown in FIGS. 3 to 5 except that a rotational operation is performed, and therefore will not be described. In the embodiment, rotation of the low-speed rotor (205 or 207 and 209) generates a high-speed rotating magnetic field inside the moving magnetic field generating apparatus 201, causing the high-speed rotor (217) to rapidly rotate. With this structure, a large proportion of the magnet array 205 can be effectively utilized to produce high magnetic coupling torque.

Figure 7B:
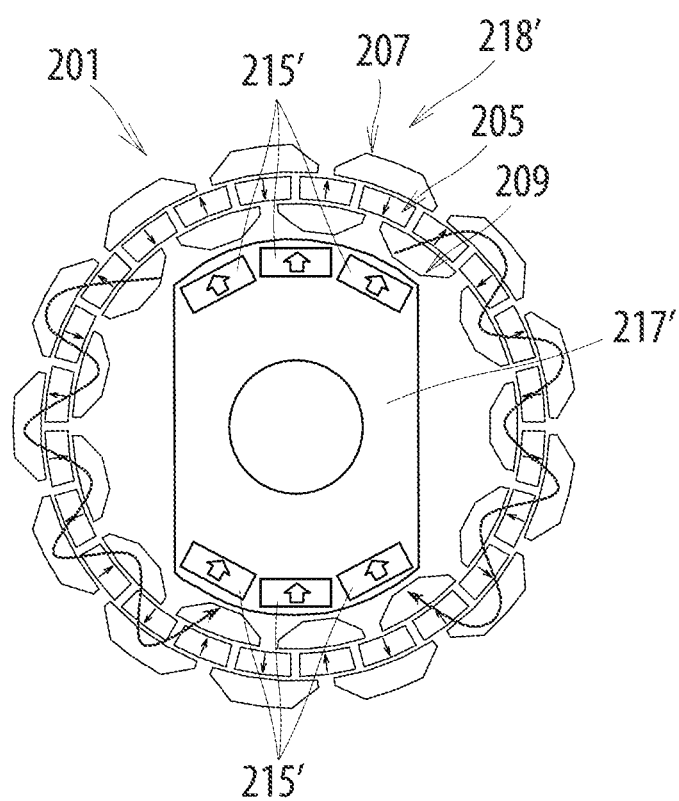

FIG. 7B shows an example in which magnets 215' of a high-speed rotor (217') have an embedded structure (IPM structure). The structure in FIG. 7B is otherwise the same as the structure in FIG. 7A. The structure in FIG. 7B can endure a centrifugal force larger than that endured by the structure in FIG. 7A. Therefore, the limit rotational speed can advantageously be increased.

Figure 8:
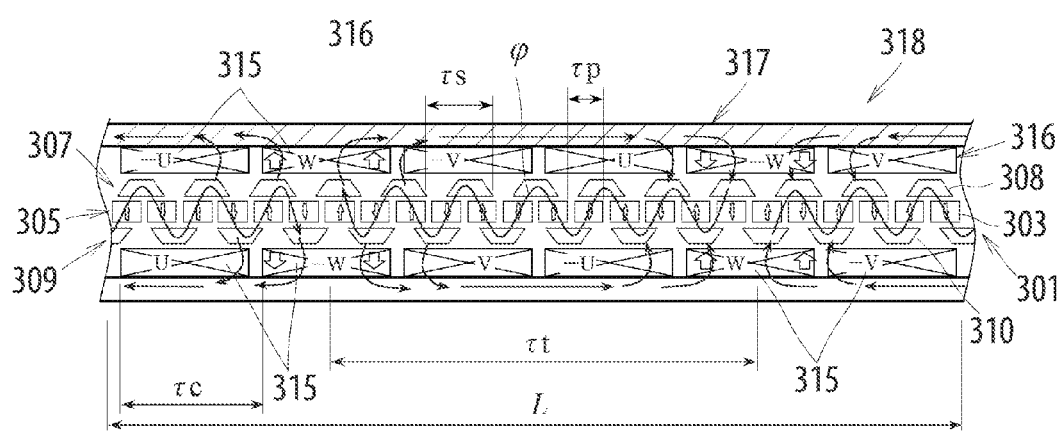
FIG. 8 shows the structure of a linear motor.

FIG. 8 shows the structure of a linear electric motor 318 including a moving magnetic field generating apparatus 301 utilized as a part of a stator and as a mover, and a magnetic pole array 316 provided on a yoke 317 of the stator and including a plurality of coils 315 disposed at a predetermined pitch $\tau c$ to form a plurality of magnetic poles. The coils 315 in the magnetic pole array 316 are disposed to face first and second magnetic pole piece arrays 307 and 309 of the moving magnetic field generating apparatus 301. In the embodiment, AC currents for three phases, namely U, W, and V phases, and for −U, −W, and −V phases flow through the coils 315. AC currents for U and −U phases, AC currents for W and −W phases, and AC currents for V and −V phases sequentially flow through the pairs of coils interposing the moving magnetic field generating apparatus 301 to form a moving magnetic field. In the linear motor 318, if a first structure formed by a magnet array 305 and a first support (not shown) and the yoke 317 including the coils 315 serve as the stator, a second structure formed by the first and second magnetic pole piece arrays 307 and 309 and a second support configured to support the first and second magnetic pole piece arrays 307 and 309 serves as the mover. In this case, the relationship between the constituent elements is as follows:

the reference movement length: L;
the number of magnets 303 in the magnet array 305 per the reference movement length L: 2·N (N is a natural number);
the pitch $\tau p$ of the magnets 303 in the magnet array 305: $\tau p = L/(2 \cdot N)$;
the number of magnetic pole pieces in each of the magnetic pole piece arrays 307 and 309 per the reference movement length L: M=N+a, where a is an integer other than 0 (a= ..., −3, −2, −1, 1, 2, 3, ...);
the pitch $\tau s$ of the magnetic pole pieces in the magnetic pole piece arrays: $\tau s = L/M$;
the pitch $\tau t$ of the synthesized magnetic poles: $\tau t = L/|(2 \cdot a)|$;
the moving speed of the magnetic pole piece arrays: vs;
the excitation frequency of the coils 315: f;
the moving speed of the magnet array: vm; and
the moving speed vc of the magnetic field generated by the coils 315: $vc = f \cdot 2 \cdot \tau t = (M/a) \cdot vs - (N/a) \cdot vm$.

In the specific example in FIG. 8, the above constituent elements are determined as follows:
L=360
2N=24
$\tau p$=15
M=13, a=1
$\tau s$=27.69
$\tau t$=180
M/a=13
N/a=12

In the embodiment, if the magnet array 305 is stationary (magnet array moving speed vm=0), when the coils 315 generate a moving magnetic field that moves at a moving speed of vc, the moving speed vs of the first and second magnetic pole piece arrays 307 and 309 is vc/13. That is, a speed reduction ratio of 1/13 is established, providing a high-thrust linear motor.

In the structure in FIG. 8, if the magnet array 305 is movable and the coils 315 and the first and second magnetic pole piece arrays 307 and 309 are stationary (magnetic pole piece array moving speed vs=0), when the coils 315 generates a moving magnetic field that moves at a moving speed of vc, the moving speed vm of the magnet array 305 is −vc/12. That is, a speed reduction ratio of −1/12 is established, providing a high-thrust linear motor (a negative value indicates a reversed drive direction).

In case of the three-phase motor according to the above embodiment, $\tau c = \tau t/3$ or $\tau c = \tau t \cdot 2/3$. In case of a two-phase electric motor, $\tau c = \tau t/2$.

Figure 9A:
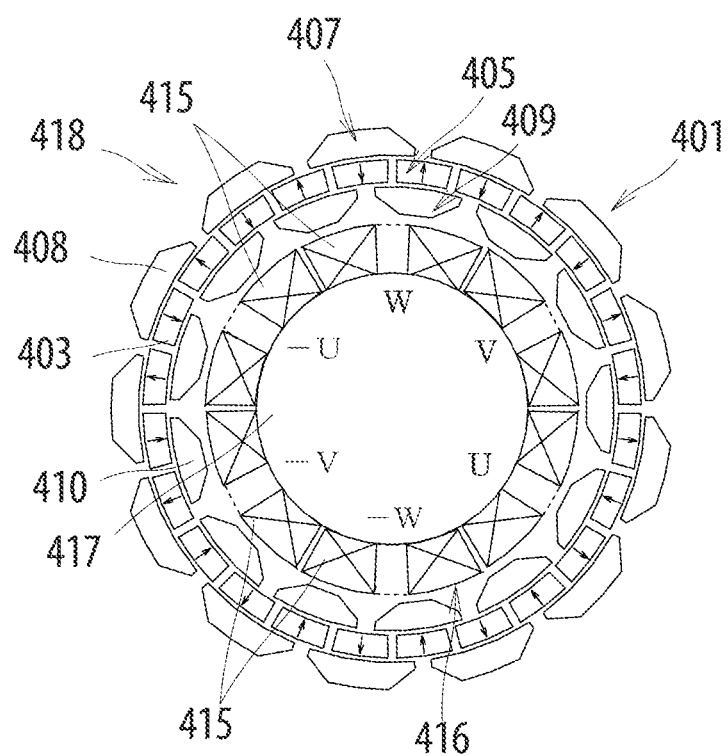
FIGS. 9A and 9B show the structure of a rotary motor.

FIG. 9A shows the structure of a rotary electric motor 418 including a moving magnetic field generating apparatus 401 according to the present invention utilized as a part of a stator and as a mover, and a magnetic pole array 416 provided on a yoke 417 of the stator and including six coils 415 disposed at a predetermined pitch $\tau c$ to form six magnetic poles. The coils 415 in the magnetic pole array 416 are disposed to face a second annular magnetic pole piece array 409 of the moving magnetic field generating apparatus 401. In the motor 418 according to the embodiment, AC currents for three phases, namely U, W, and V phases, and for −U, −W, and −V phases flow through the coils 415.

In the embodiment, AC excitation of the coils 415 generates a rotating magnetic field. Defining the rotational speed of the rotating magnetic field generated by the coils 415 as $\omega c$, the rotational speed of a magnet array 405 as $\omega m$, and the rotational speed of the magnetic pole piece arrays 407 and 409 as $\omega s$, the relationship among the rotational speeds can be represented by the following formula:

$$\omega c = (M/a) \cdot \omega s - (N/a) \cdot \omega m$$

In the specific example in FIG. 9A, the constituent elements are determined as follows:
the number of magnets 403 in one round of the magnet array 405: 2N=24
the number of magnetic pole pieces in the magnetic pole piece array: M=13
the difference between M and N: a=1

If the magnet array 405 is stationary and the rotational speed $\omega m$ of the magnet array 405 is determined as $\omega m$=0, the rotational speed $\omega s$ of the magnetic pole piece arrays 407 and 409 is determined as $\omega s = \omega c/13$. That is, a speed reduction ratio of 1/13 is established with respect to the rotating magnetic field generated by the coils 415, efficiently producing high torque at a low speed.

If the magnetic pole piece arrays 407 and 409 are stationary and the rotational speed $\omega s$ of the magnetic pole piece arrays 407 and 409 is determined as $\omega s$=0, the rotational speed $\omega m$ of the magnet array 405 is determined as ωm=ωc/12. That is, a speed reduction ratio of −1/12 is established with respect to the rotating magnetic field generated by the coils 415, thereby efficiently producing high torque at a low speed (a negative value indicates a reversed rotational direction).

According to the embodiment, a large proportion of the magnet array 405 can be effectively utilized to produce high torque. If the rotor is provided on the input side, this structure serves as a generator. Because a magnetic field that rotates at a high speed is generated, the generator efficiently produces a high induced voltage.

Figure 9B:
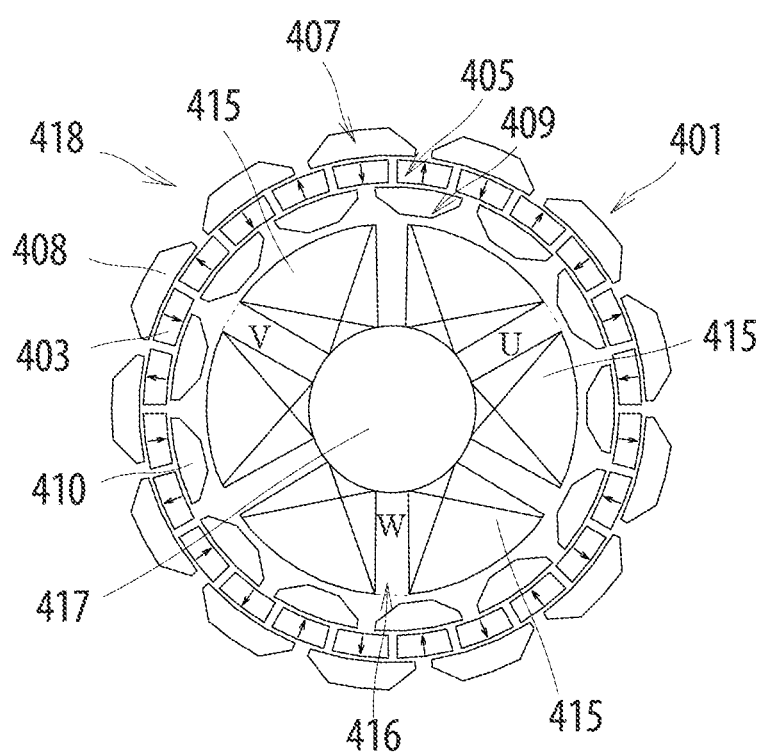

FIG. 9B shows an example in which only three coils for three phases are provided as the coils 415 and other elements are the same as the structure in FIG. 9A.

Figure 10B:
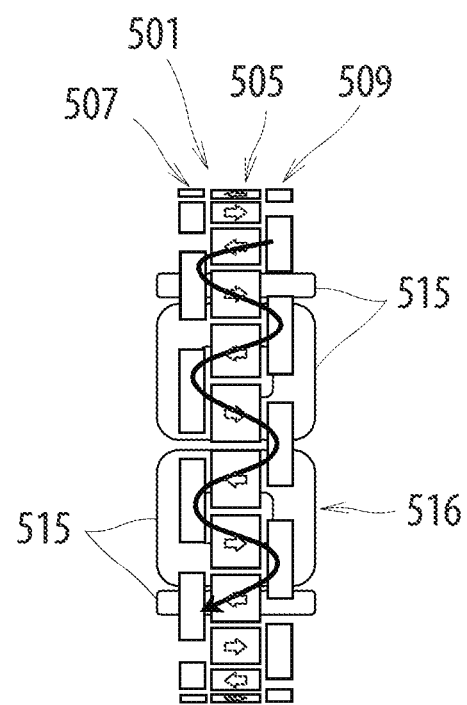

FIGS. 10A and 10B are a plan view and a side view, respectively, showing a schematic structure of a rotary electric motor 518 including a moving magnetic field generating apparatus 501 according to the present invention utilized as a part of a stator and as a mover, and a magnetic pole array 516 disposed on the outer peripheral portion of a yoke 517 of the stator and including six coils 515 disposed at a predetermined pitch τc to form six magnetic poles. First and second annular magnetic pole piece arrays 507 and 509 and a magnet array 505 are disposed to face each other in the axial direction, and to face the coils 515 in the magnetic pole array 516 in the radial direction. Also in the motor 518 according to the embodiment, AC currents for three phases flow through the coils 515. In the motor 518, one of the magnet array 505 and the first and second magnetic pole piece arrays 507 and 509 is used as the stator, and the other is used as the rotor (mover). If the coils 515 are excited to generate a rotating magnetic field, a high-efficiency motor capable of generating high torque at a low speed can be obtained. If the rotor is rotated by an external force, a high-speed rotating magnetic field is generated inside the moving magnetic field generating apparatus 501. The high-speed rotating magnetic field raises a voltage induced in the coils 515, and therefore a high-efficiency generator can be obtained.

Figure 11A:
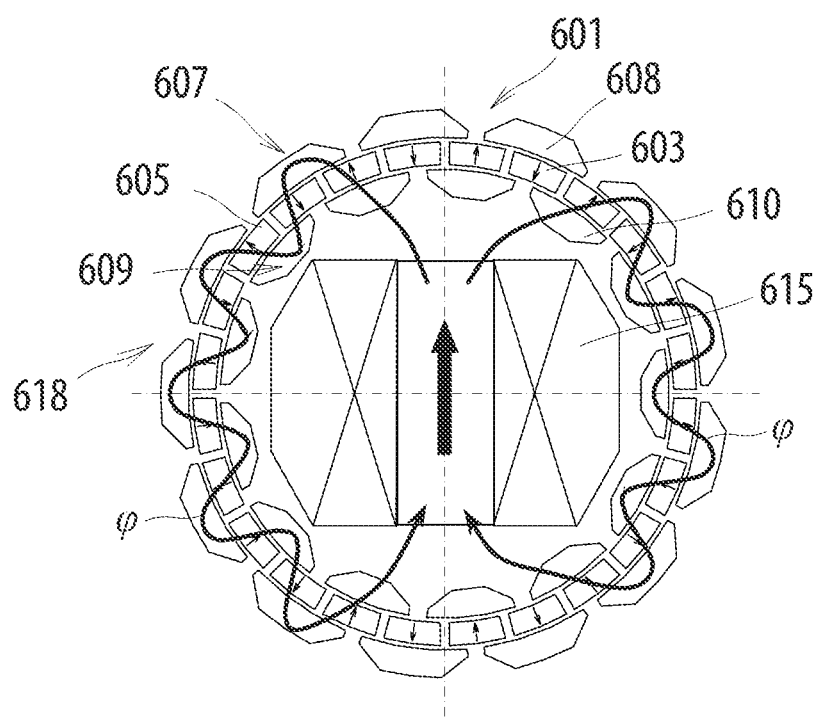
FIGS. 11A and 11B each show a schematic structure of a single-phase generator.
Figure 11B:
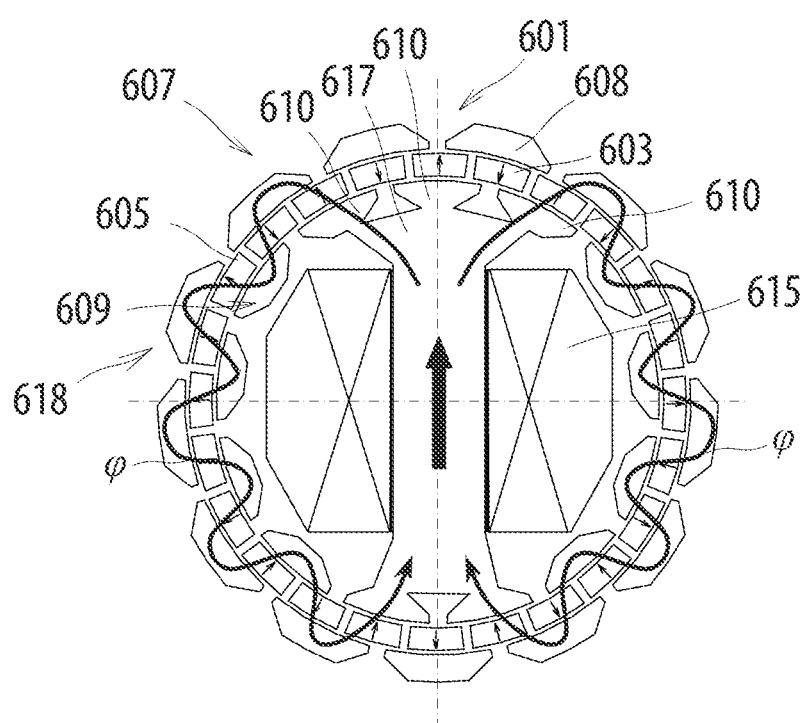

FIGS. 11A and 11B each show a schematic configuration of a single-phase electric generator 618 including a moving magnetic field generating apparatus 601 according to the present invention, and coils 615 for power generation disposed inside an annular magnet array 605 and first and second annular magnetic pole piece arrays 607 and 609 forming the moving magnetic field generating apparatus 601. In the generator 618 according to the embodiment, one of the magnet array 605 and the first and second magnetic pole piece arrays 607 and 609 is used as the stator, and the other is used as the rotor (mover). When the rotor is rotated, a high-speed rotating magnetic field is generated inside the moving magnetic field generating apparatus 601, and interlinkage with the coils 615 generates electric power. In the conventional generator, a speed increasing gear is used to rotate the generator at a high speed in order to allow an operation in a range where a high efficiency is achieved, that is, in a high-speed range. However, the gear has a limited life and may be broken, presenting issues to be addressed in terms of cost and maintenance. In addition, the gear may have a complicated configuration, hindering a reduction in the size of the generator. In the generator 618 which uses the moving magnetic field generating apparatus 601 according to the present invention, in contrast, the rotational speed of the moving magnetic field is high compared to the rotational speed of the rotor. Therefore, a high voltage is induced to enable high-efficiency power generation even when the rotational speed of the rotor is low. Thus, a speed increasing gear can be dispensed with. If the magnetic pole piece arrays 607 and 609 are stationary and the magnet array 605 is provided on the rotor as in the generator shown in FIG. 11B, an iron core 617 disposed inside the coils 615 and some of magnetic pole pieces 610 in the second magnetic pole piece array 609 may be coupled to each other. With such a structure, when the rotor is rotated, a high-speed rotating magnetic field is generated inside the moving magnetic field generating apparatus 601. Therefore, a large proportion of the magnet array 605 can be effectively utilized. Because a magnetic field that rotates at a high speed is generated, moreover, the generator efficiently works to produce a high induced voltage.

Figure 12:
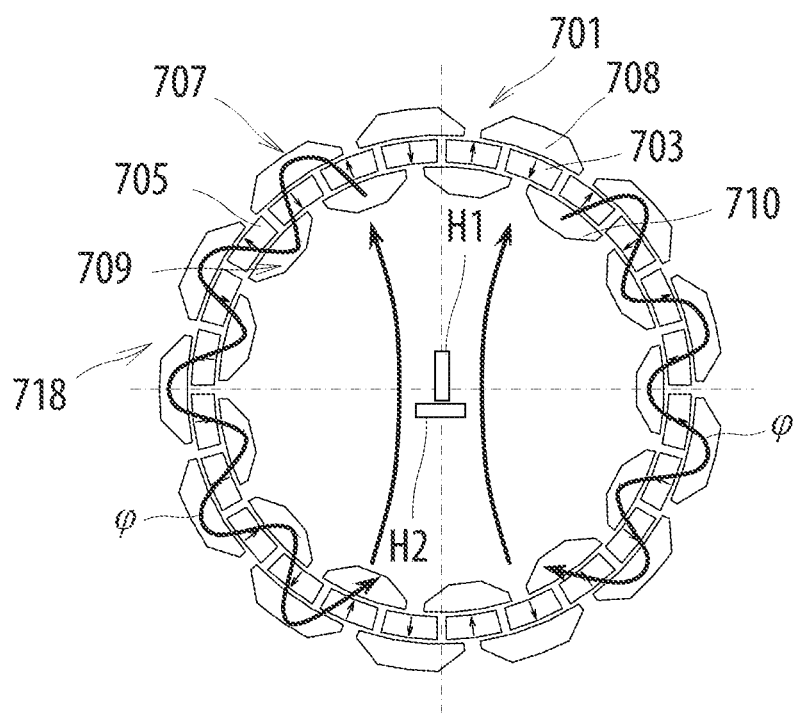
FIG. 12 shows the configuration of a high-precision magnetic encoder.
Figure 13A:
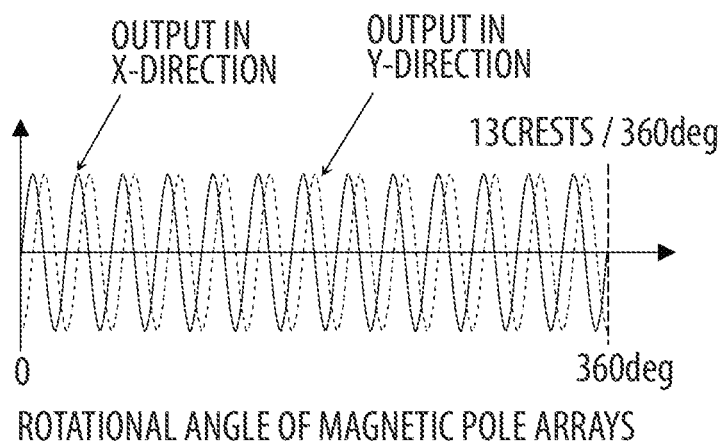
FIGS. 13A and 13B show waveforms output from two Hall elements.
Figure 13B:
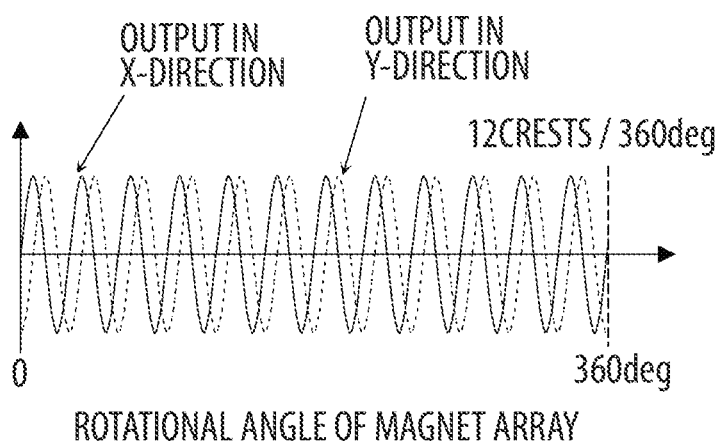

FIG. 12 shows the configuration of a high-precision magnetic encoder 718 including a rotary moving magnetic field generating apparatus 701, and two Hall elements H1 and H2 disposed inside a second annular magnetic pole piece array 709 of the moving magnetic field generating apparatus 701. The two Hall elements H1 and H2 are disposed to detect magnetism in X and Y directions differing by 90 degrees. In the encoder 718, one of the magnet array 705 and the first and second magnetic pole piece arrays 707 and 709 is used as the stator, and the other is used as the rotor. When the rotor is rotated, a high-speed rotating magnetic field is generated inside the moving magnetic field generating apparatus 701. In the embodiment in FIG. 12, one rotation of the magnetic pole piece arrays 707 and 709 results in 13 rotations of the internal magnetic field as shown in FIG. 13A. One rotation of the magnet array 705 results in 12 rotations of the internal magnetic field as shown in FIG. 13B. Therefore, a high-resolution magnetic sensor can be formed by simple detecting elements. The magnetic encoder according to the embodiment detects magnetism synthesized from magnetism from all the magnets 703. Therefore, the effect of an error for each magnet is only marginal, and a high precision is obtained.

As shown in FIG. 14, two Hall elements H11 and H12 may be disposed in the X direction, and two Hall elements H21 and H22 may be disposed in the Y direction. This allows outputs from the two Hall elements to be averaged, thereby obtaining a magnetic encoder with a further higher precision.

Figure 15:
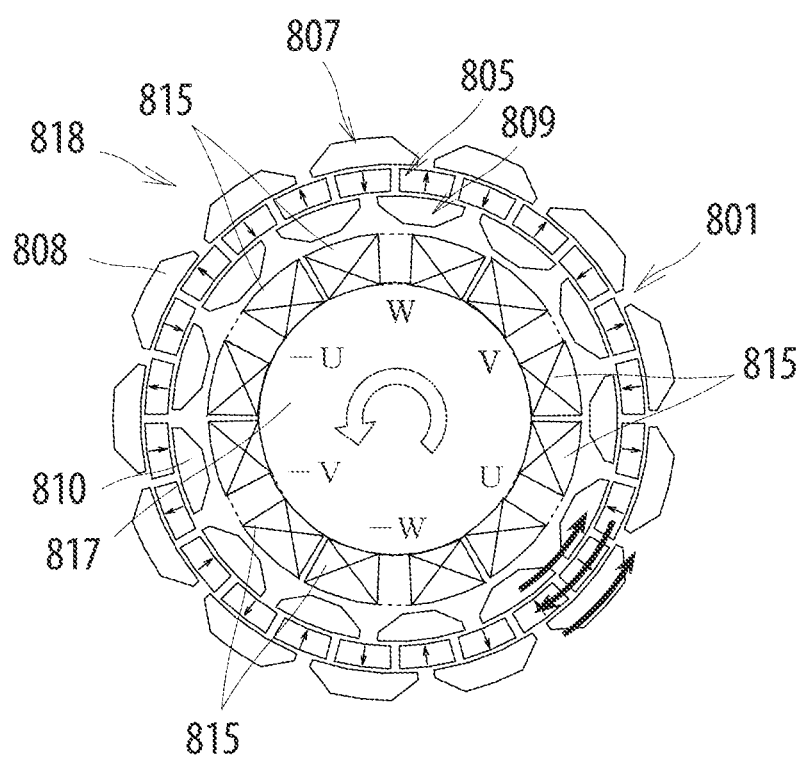
FIG. 15 shows a schematic structure of a counter-rotating motor.

FIG. 15 shows a schematic structure of a counter-rotating electric motor. The counter-rotating electric motor includes a first rotary structure including a magnet array 805 of a rotary moving magnetic field generating apparatus 801, a second rotary structure including first and second magnetic pole piece arrays 807 and 809 of the moving magnetic field generating apparatus 801, and a motor stator 817 including excitation coils 815 for three phases disposed inside the first and second rotary structures to generate a rotating magnetic field. The first rotary structure and the second rotary structure are configured to be rotatable independently of each other. The first rotary structure and the second rotary structure rotate in directions opposite to each other.

When three-phase currents are applied to the excitation coils 815, a rotating magnetic field is generated to rotate the first rotary structure including the magnet array 805 and the second rotary structure including the first and second magnetic pole piece arrays 807 and 809 in directions opposite to each other. The first and second rotary structures are rotated at a low speed compared to the rotating magnetic field to produce high torque. Thus, a fan with a high-static pressure and high-efficiency is obtained.

In the embodiment, if the magnetic field generated by the excitation coils 815 is rotated counterclockwise, the rotor including the first and second magnetic pole piece arrays 807 and 809 (second rotary structure) is rotated counterclockwise, and the rotor including the magnet array 805 (first rotary structure) is rotated clockwise.

Figure 16A:
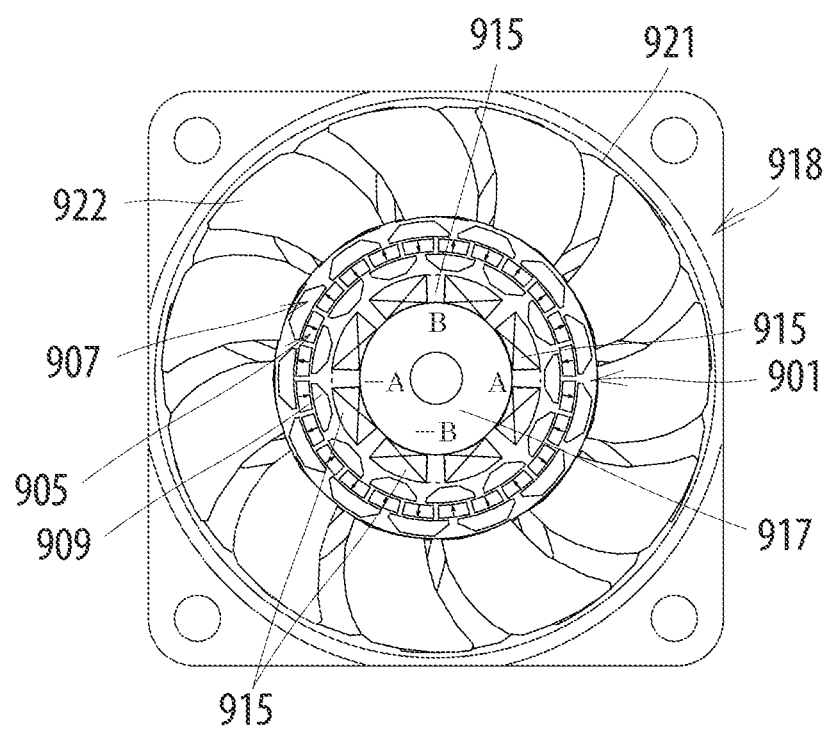
FIGS. 16A and 16B are a cross-sectional view and a partial cross-sectional view, respectively, showing the configuration of a counter-rotating fan including a counter-rotating motor obtained by providing the counter-rotating motor in FIG. 15 with excitation coils for only two phases.
Figure 16B:
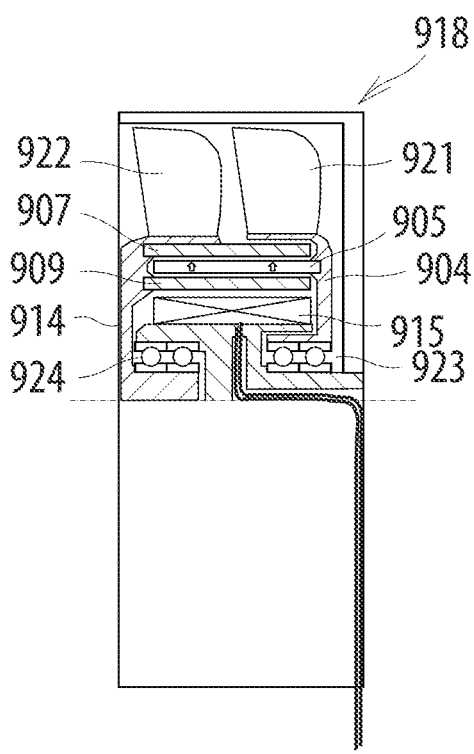

FIGS. 16A and 16B are a cross-sectional view and a partial cross-sectional view, respectively, showing the configuration of a counter-rotating electric fan 918 that utilizes a counter-rotating electric motor obtained by providing the counter-rotating electric motor in FIG. 15 with excitation coils for only two phases. The counter-rotating electric fan 918 includes a first impeller 921 attached to a first rotary structure 904 including a magnet array 905, and a second impeller 922 attached to a second rotary structure 914 including first and second magnetic pole piece arrays 907 and 909. Reference numerals 923 and 924 each denote a bearing. A plurality of blades provided to the first impeller 921 and a plurality of blades provided to the second impeller 922 are shaped in such a manner that a rotational direction of the air discharged from the first impeller is different from a rotational direction of the air discharged from the second impeller when the first impeller 921 and the second impeller 922 are rotated in directions opposite to each other. When currents for two phases are applied to two-phase coils 915 disposed inside the first and second rotary structures 904 and 914, the two-phase coils 915 generate a rotating magnetic field. This causes the first rotary structure 904 provided with the magnet array 905 and the second rotary structure 914 provided with the first and second magnetic pole piece arrays 907 and 909 to rotate in directions opposite to each other. The first and second rotary structures 904 and 914 produce air pressures in the same direction. Thus, a fan with a high-flow and high-pressure is obtained. Conventionally, separate motors are used to achieve forward and reverse rotations. According to the embodiment, however, a single motor and a motor driving circuit may be used to achieve forward and reverse rotations. Thus, the counter-rotating electric fan can be reduced in dimension in the axial direction, thereby reducing the cost of the fan. The rotational speeds of the impellers 921 and 922 may arbitrarily be determined and the respective impellers may rotate according to their loads. As a result, an optimum flow is achieved while suppressing noise.

A magnetism speed decreasing mechanism of the moving magnetic field generating apparatus 901 makes it possible to generate high torque, thereby achieving a high self-starting frequency, stable operation, and a high static pressure.

Figure 17B:
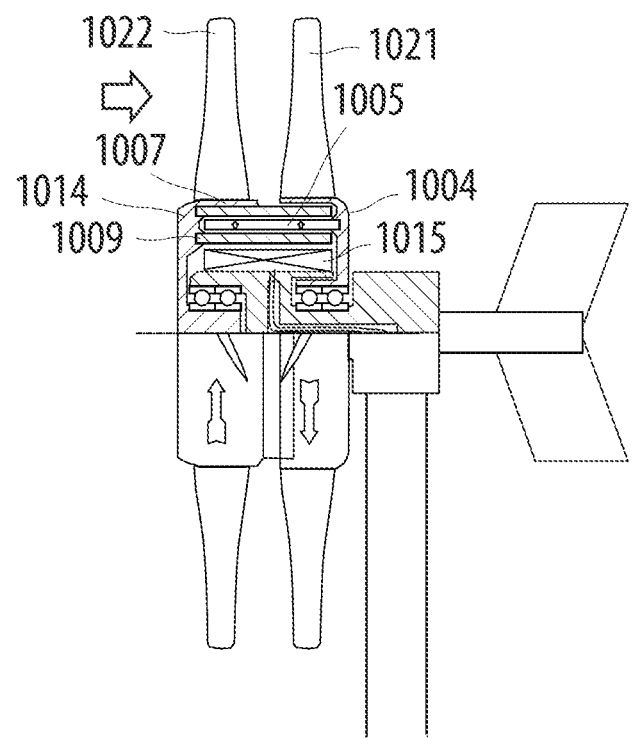

FIGS. 17A and 17B are a front view and a side view, respectively, of a counter-rotating aerogenerator 1018 partially shown in cross section. The counter-rotating aerogenerator 1018 includes a first rotary structure 1004 including a magnet array 1005 of a rotary moving magnetic field generating apparatus 1001, a second rotary structure 1014 including first and second magnetic pole piece arrays 1007 and 1009 of the moving magnetic field generating apparatus 1001, a plurality of coils 1015 for power generation disposed inside the first and second rotary structures 1004 and 1014, a first impeller 1021 attached to the first rotary structure 1004, and a second impeller 1022 attached to the second rotary structure 1014 and configured to be rotatable in the direction opposite to the rotational direction of the first impeller 1021. The first rotary structure 1004 and the second rotary structure 1014 are configured to be rotatable independently of each other. In the aerogenerator 1018, the first impeller 1021 and the second impeller 1022 are rotated in directions opposite to each other upon receiving a wind. Then, a high-speed rotating magnetic field is generated by the coils 1015, and a high voltage is induced in the coils 1015, thereby enabling high-efficiency power generation. In the embodiment, the internal magnetic field is rotated at a rotational speed that is "13 times the rotational speed of the second impeller 1022+12 times the rotational speed of the first impeller 1021". In the embodiment, a two-phase generator is provided. However, a single-phase generator may be provided by providing coils in a single-phase configuration, and a three-phase generator may be provided by providing coils in a three-phase configuration. The rotational speeds of the first impeller 1021 and the second impeller 1022 do not necessarily coincide with each other, and the first impeller 1021 and the second impeller 1022 may be rotated according to the received wind pressures. Noise due to resonant vibration can be suppressed when the rotational speeds of the first impeller 1021 and the second impeller 1022 are different from each other.

Figure 18:
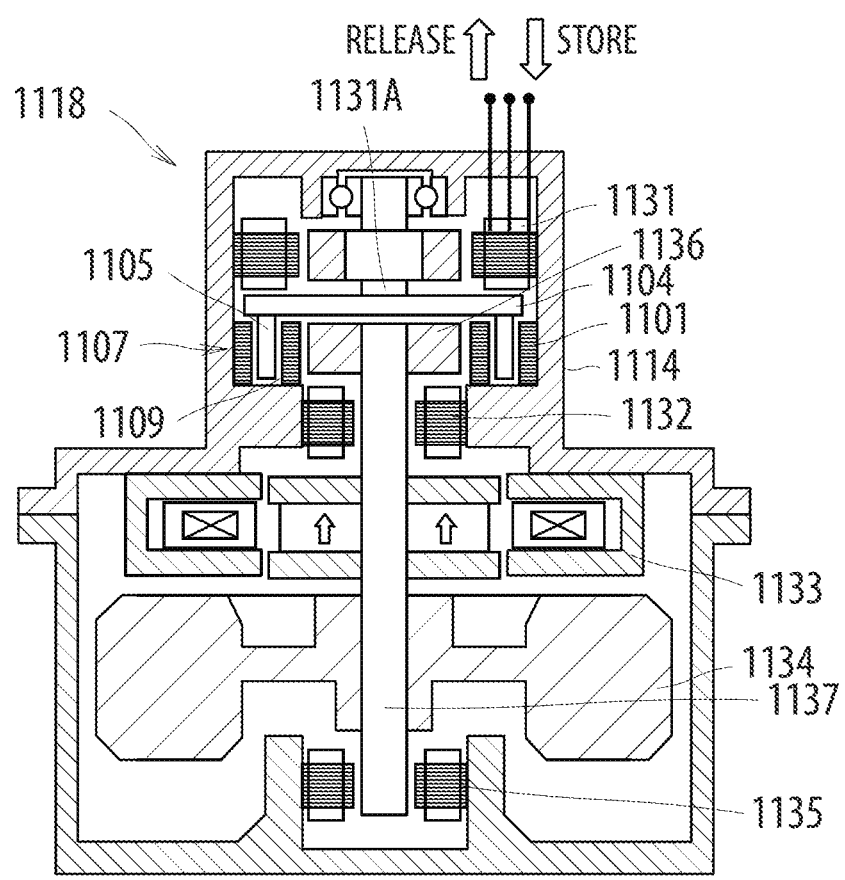
FIG. 18 is a schematic cross-sectional view of an embodiment in which a rotary moving magnetic field generating apparatus is used as a speed increasing magnetic coupling in a flywheel power storage apparatus.

FIG. 18 is a schematic cross-sectional view of an embodiment of the present invention in which a rotary moving magnetic field generating apparatus 1101 is used as a speed increasing magnetic coupling in a flywheel power storage apparatus 1118. The flywheel power storage apparatus 1118 includes a generator motor 1131, a first structure 1104 including a magnet array 1105 and fixed to a rotary shaft 1131A of the generator motor 1131, and a second structure 1114 serving as a case body and including first and second magnetic pole pieces 1107 and 1109 fixed thereto. The flywheel power storage apparatus 1118 also includes a rotor 1136 disposed centrally of the first structure 1104 and the second structure 1114, and a flywheel 1134 fixed to a shaft 1137 to which the rotor 1136 is fixed. The rotor 1136 includes a magnet array including a plurality of magnets disposed at a predetermined pitch such that N and S poles of adjacent magnets in the magnet array are alternated. The shaft 1137 is rotatably supported by a vertical bearing 1133 and a radial bearing 1135. In the apparatus 1118, the flywheel 1134 is rotated to store energy, and the energy stored in the flywheel 1134 is output from the generator motor 1131 as electric power. When the flywheel 1134 is rotated by the generator motor 1131 via the speed increasing magnetic coupling formed by the moving magnetic field generating apparatus 1101 as in the embodiment, kinetic energy in an amount proportional to the square of the rotational speed of the flywheel 1134 can be stored. The flywheel 1134 can be rotated at a rotational speed several times to several tens of times of the motor rotational speed, in particular through the speed increasing mechanism. This allows a greater amount of energy to be stored for the same volume of the apparatus, which, in turn, enables a reduction in size of the apparatus.

Figure 19:
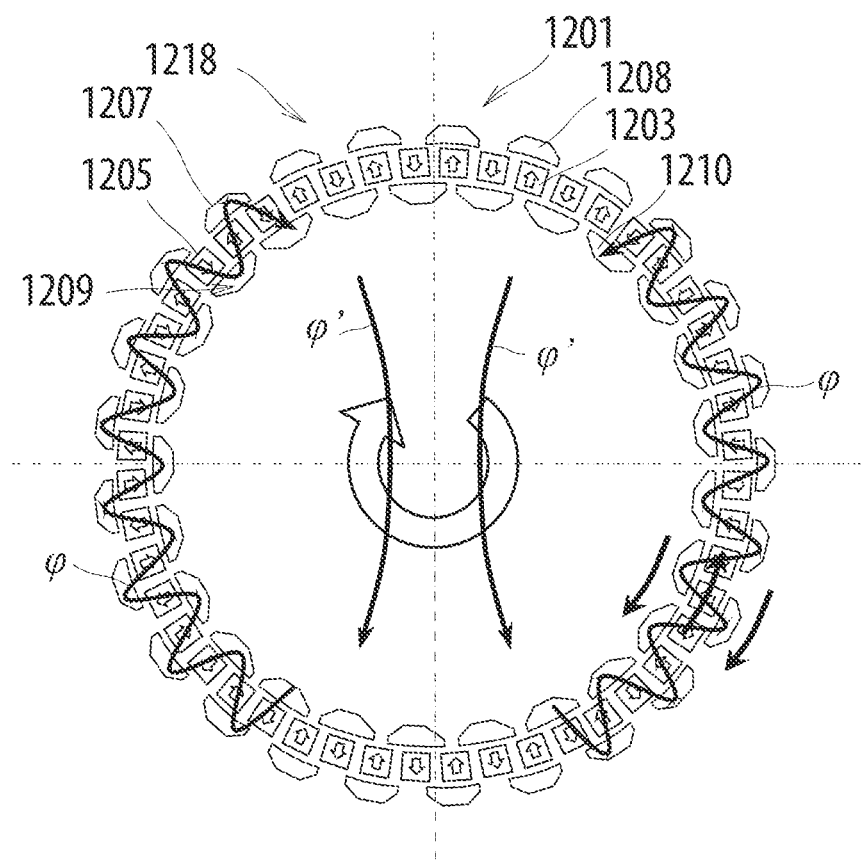
FIG. 19 shows the structure of a rotary moving magnetic field generating apparatus incorporated in a gravity shielding apparatus according to an embodiment.
Figure 20:
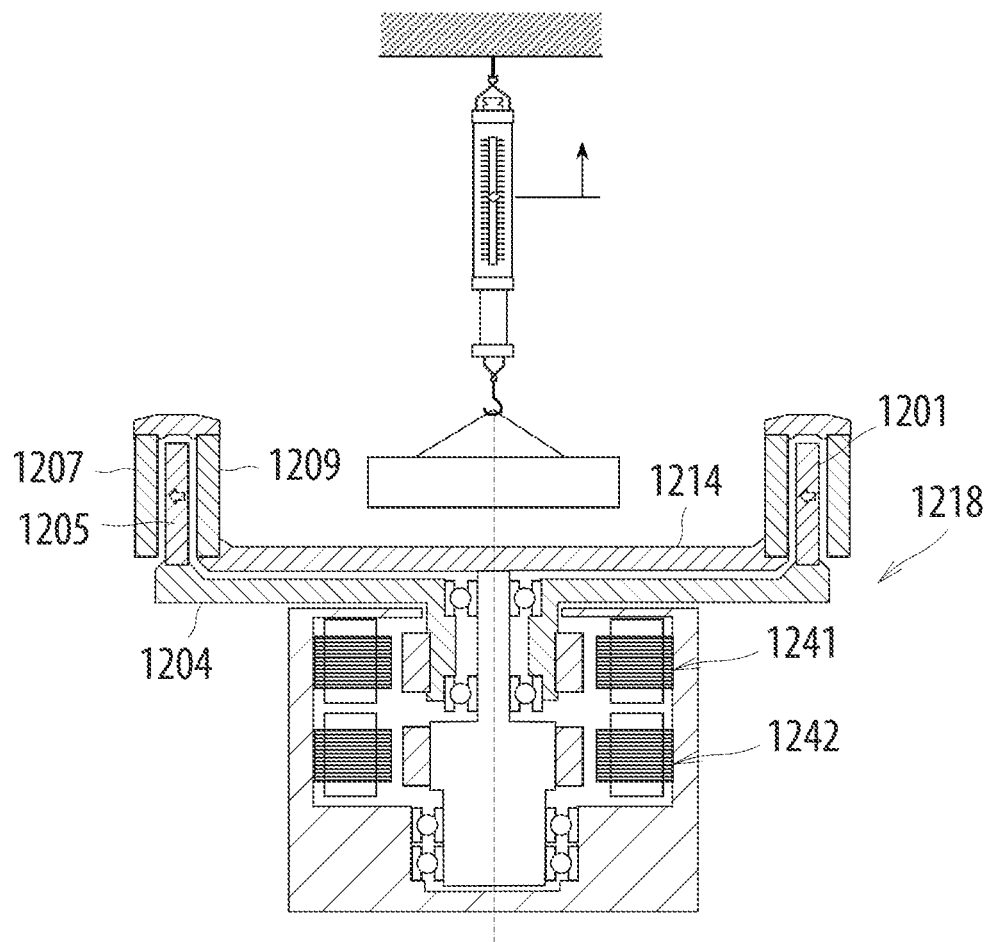
FIG. 20 is a vertical cross-sectional view of the gravity shielding apparatus.

FIG. 19 shows the structure of a rotary moving magnetic field generating apparatus 1201 incorporated in a gravity shielding apparatus 1218 according to an embodiment. FIG. 20 is a vertical cross-sectional view of the gravity shielding apparatus 1218. The gravity shielding apparatus 1218 includes a first rotary structure 1204 including a magnet array 1205, and a second rotary structure 1214 including first and second magnetic pole piece arrays 1207 and 1209. The first rotary structure 1204 and the second rotary structure 1214 are configured to be rotatable independently of each other. The gravity shielding apparatus 1218 also includes a first motor 1241 configured to rotate the first rotary structure 1204, and a second motor 1242 configured to rotate the second rotary structure 1214 in the direction opposite to the rotational direction of the first rotary structure 1204. The number of first magnetic pole pieces 1208 is 25. The number of second magnetic pole pieces 1210 is also 25. The number of magnets 1203 is 48. Defining the rotational speed of the first rotary structure 1204 as fm, and the rotational speed of the second rotary structure 1214 as ft, the rotational speed f of a high-speed rotating magnetic field is determined as $f=24\,fm+25\,ft$. Thus, in the apparatus 1218, a high-speed rotating magnetic field can be generated inside the moving magnetic field generating apparatus 1201.

For example, if fm=10,000 rpm and ft=10,000 rpm, then the rotational speed f of the internal rotating magnetic field is high at f=490,000 rpm. Thus, a high-speed rotating magnetic field that rotates at a speed 49 times the original speed can be obtained.

Figure 21A:
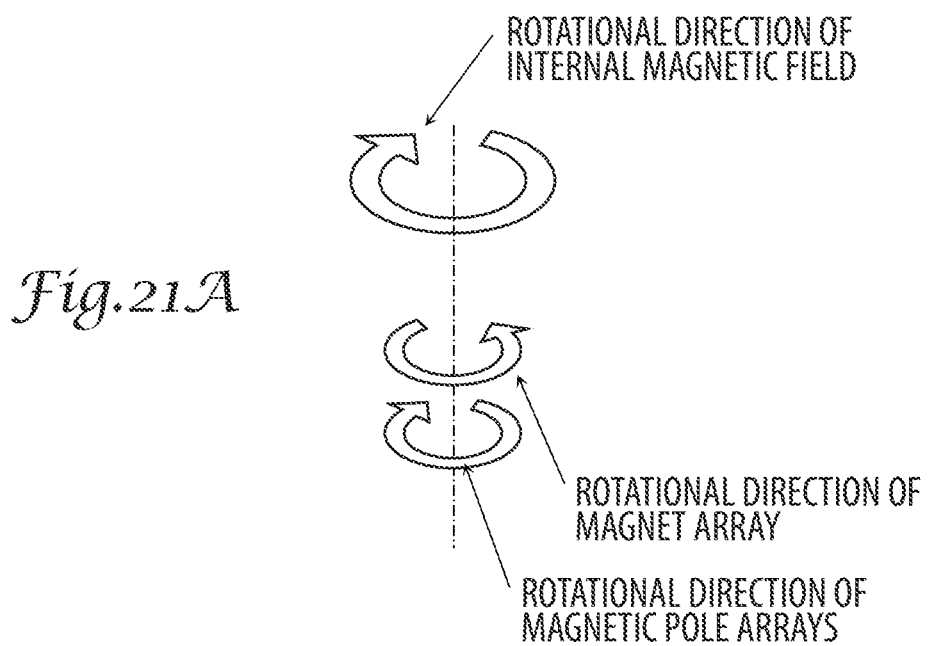
FIGS. 21A and 21B illustrate the rotational direction of a magnet array, the rotational direction of first and second magnetic pole piece arrays, and the rotational direction of a rotating magnetic field generated inside the moving magnetic field generating apparatus.
Figure 21B:
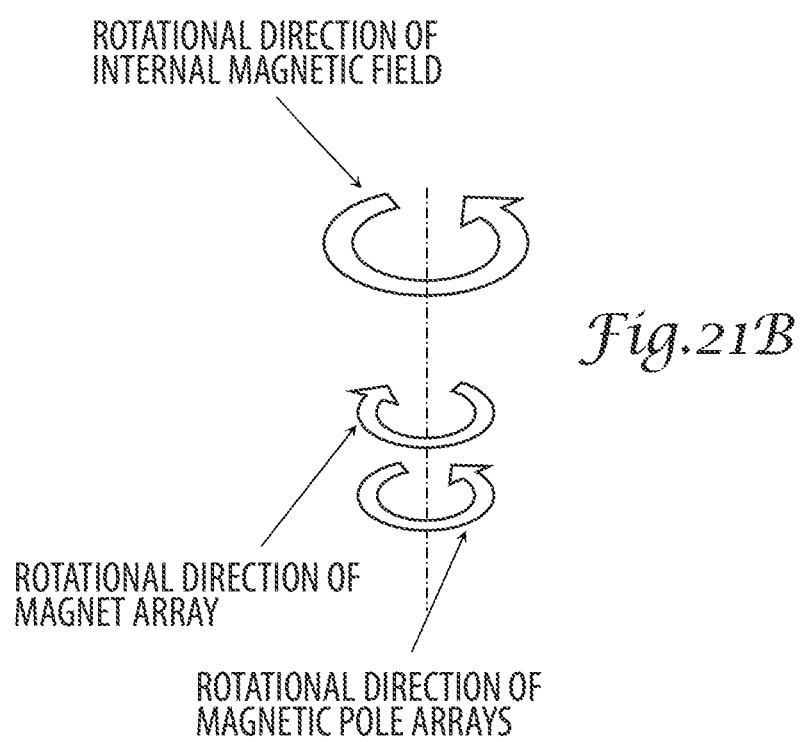

If a metal, insulating, dielectric, superconducting, or other material is disposed in the high-speed rotating magnetic field as shown in FIG. 20, a gravity shielding effect or a gravity reducing effect that the gravity acting on the material is reduced can be obtained. The insulating, dielectric, superconducting, or other material may be, or may not be, rotated together with the rotary shaft. FIGS. 21A and 21B illustrate the rotational direction of the magnet array 1205, the rotational direction of the first and second magnetic pole piece arrays 1207 and 1209, and the rotational direction of the rotating magnetic field generated inside the moving magnetic field generating apparatus 1201.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. A moving magnetic field generating apparatus comprising:
    a magnet array including a plurality of magnets disposed at a first pitch such that N and S poles of adjacent magnets in the magnet array are alternated; and
    first and second magnetic pole piece arrays extending along the magnet array to interpose the magnet array therebetween with a gap from the magnet array, the first and second magnetic pole piece arrays being rotationally offset relative to one another so as to have a predetermined phase difference between each other,
    the first magnetic pole piece array including a plurality of first magnetic pole pieces disposed at a second pitch in an array and each having a length enough to face at least two adjacent magnets in the magnet array,
    the second magnetic pole piece array including a plurality of second magnetic pole pieces disposed at the second pitch in an array and each having a length enough to face at least two adjacent magnets in the magnet array, wherein
    the first and second pitches and the phase difference are set such that, when one of the first and second magnetic pole piece arrays and the magnet array makes a relative movement with respect to the other at a predetermined relative moving speed, magnetic flux emanating from n consecutive magnets in the magnet array, where n is a natural number, forms synthesized magnetic flux that sequentially passes through the first magnetic pole pieces in the first magnetic pole piece array facing the n magnets and the second magnetic pole pieces in the second magnetic pole piece array facing the n magnets, thereby forming a high-speed moving magnetic field that moves at a speed faster than the predetermined relative moving speed.

2. The moving magnetic field generating apparatus according to claim 1,
    wherein:
    a reference movement length, which is a length corresponding to one rotation of the magnet array, is equal to L,
    the number of the plurality of magnets in the magnet array per the reference movement length, is equal to 2N,
    the number of magnetic pole pieces in each of the first and second magnetic pole piece arrays per the reference movement length is equal to M=N+a, where a is an integer other than 0,
    the moving speed of the magnetic pole pieces is equal to vs, and
    the moving speed of the magnet array is equal to vm,
    L, N, and a are set such that:
    the first pitch τp of the magnets satisfies τp =L/(2·N);
    the second pitch τs of the magnetic pole pieces satisfies τs =L/M; and
    the moving speed vt of the high-speed moving magnetic field satisfies vt=(M/a)·vs−(N/a)·vm.

3. The moving magnetic field generating apparatus according to claim 1, wherein
    the magnet array and the first and second magnetic pole piece arrays each have a linear shape.

4. The moving magnetic field generating apparatus according to claim 1, wherein
    the magnet array and the first and second magnetic pole piece arrays each have a concentric annular shape.

5. The moving magnetic field generating apparatus according to claim 2, wherein
    the magnet array and the first and second magnetic pole piece arrays each have a linear shape.

6. The moving magnetic field generating apparatus according to claim 2, wherein
    the magnet array and the first and second magnetic pole piece arrays each have a concentric annular shape.

7. A magnetism transfer speed increasing/decreasing apparatus comprising:
    a magnet array including a plurality of magnets disposed at a first pitch such that N and S poles of adjacent magnets in the magnet array are alternated; and
    first and second magnetic pole piece arrays extending along the magnet array to interpose the magnet array therebetween with a gap from the magnet array, the first and second magnetic pole piece arrays being disposed with a predetermined phase difference between each other,
    the first magnetic pole piece array including a plurality of first magnetic pole pieces disposed at a second pitch in an array and each having a length enough to face at least two adjacent magnets in the magnet array,
    the second magnetic pole piece array including a plurality of second magnetic pole pieces disposed at the second pitch in an array and each having a length enough to face at least two adjacent magnets in the magnet array, wherein
    the first and second pitches and the phase difference are determined such that, when one of the first and second magnetic pole piece arrays and the magnet array makes a relative movement with respect to the other at a predetermined relative moving speed, magnetic flux emanating from n consecutive magnets in the magnet array, where n is a natural number, forms synthesized magnetic flux that sequentially passes through the first magnetic pole pieces in the first magnetic pole piece array facing the n magnets and the second magnetic pole pieces in the second magnetic pole piece array facing the n magnets, thereby forming a high-speed moving magnetic field that moves at a speed faster than the predetermined relative moving speed; and
    a moving device including a movable magnet array including a plurality of magnets disposed at a predetermined pitch such that N and S poles of adjacent magnets in the magnet array are alternated, the magnets in the movable magnet array being disposed to face at least one of the first and second magnetic pole piece arrays of the moving magnetic field generating apparatus.

* * * * *